US008511626B1

(12) United States Patent
Trinh et al.

(10) Patent No.: US 8,511,626 B1
(45) Date of Patent: Aug. 20, 2013

(54) MOUNTING ASSEMBLY FOR A GPS

(71) Applicants: Albert Long Trinh, Maineville, OH (US); Dennis Sam Trinh, Maineville, OH (US); Toan Trinh, Maineville, OH (US)

(72) Inventors: Albert Long Trinh, Maineville, OH (US); Dennis Sam Trinh, Maineville, OH (US); Toan Trinh, Maineville, OH (US)

( * ) Notice: Subject to any disclaimer, the term of this patent is extended or adjusted under 35 U.S.C. 154(b) by 0 days.

(21) Appl. No.: 13/835,375

(22) Filed: Mar. 15, 2013

Related U.S. Application Data

(62) Division of application No. 13/305,260, filed on Nov. 28, 2011, which is a division of application No. 12/384,355, filed on Apr. 3, 2009, now abandoned.

(51) Int. Cl.
*H04N 5/64* (2006.01)
*B60J 3/00* (2006.01)

(52) U.S. Cl.
USPC ............... 248/206.2; 248/187.1; 348/842

(58) Field of Classification Search
USPC ............... 359/601, 609, 610, 613; 248/139, 248/181.1, 181.2, 187.1, 206.2, 683, 688, 248/689; 348/842
See application file for complete search history.

(56) References Cited

U.S. PATENT DOCUMENTS 5,069,529 A * 12/1991 Takahashi ............... 359/601
6,050,833 A * 4/2000 Danzyger et al. ............ 439/92
7,516,928 B2 * 4/2009 Kalis et al. ............ 248/288.31
7,661,648 B2 * 2/2010 Lin ............... 248/683
7,878,467 B2 * 2/2011 Chen et al. ............ 248/206.2
8,356,781 B2 * 1/2013 Chen et al. ............ 248/206.2
2002/0176170 A1 * 11/2002 Huang ............ 359/609
2009/0072118 A1 * 3/2009 Zheng ............ 248/683
2009/0230716 A1 * 9/2009 Chae ............ 296/97.9
2010/0254014 A1 * 10/2010 Trinh et al. ............ 359/601
2010/0320341 A1 * 12/2010 Baumann et al. ............ 248/206.2
2011/0057006 A1 * 3/2011 Smith ............ 224/276
2011/0057083 A1 * 3/2011 Carnevali ............ 248/274.1
2012/0049019 A1 * 3/2012 Chen ............ 248/206.2

FOREIGN PATENT DOCUMENTS

JP 07159193 A * 6/1995
JP 2008162575 A * 7/2008

* cited by examiner

*Primary Examiner* — Mark Consilvio
(74) *Attorney, Agent, or Firm* — Hasse & Nesbitt LLC; Daniel F. Nesbitt

(57) ABSTRACT

A GPS device comprises a GPS unit, a visor, and an optional attachment means to attach the visor to the GPS unit to improve the viewing of the visual display screen under bright light and/or to eliminate the reflection of the lighted display screen of the GPS unit from a vehicle's windshield during nighttime driving; a visor set comprising said visor and said attachment means; said visor or visor set optionally comprising a GPS antenna for stronger reception and/or a faster acquisition of satellite GPS signals; a method for improving the viewing of the display screen under bright light, for eliminating reflection of the display screen from the vehicle's windshield, and for providing improved satellite GPS signals by using the GPS device or the visor set hereinabove; and an article of manufacture comprising the GPS device or the visor set hereinabove, in association with instructions for use.

26 Claims, 12 Drawing Sheets

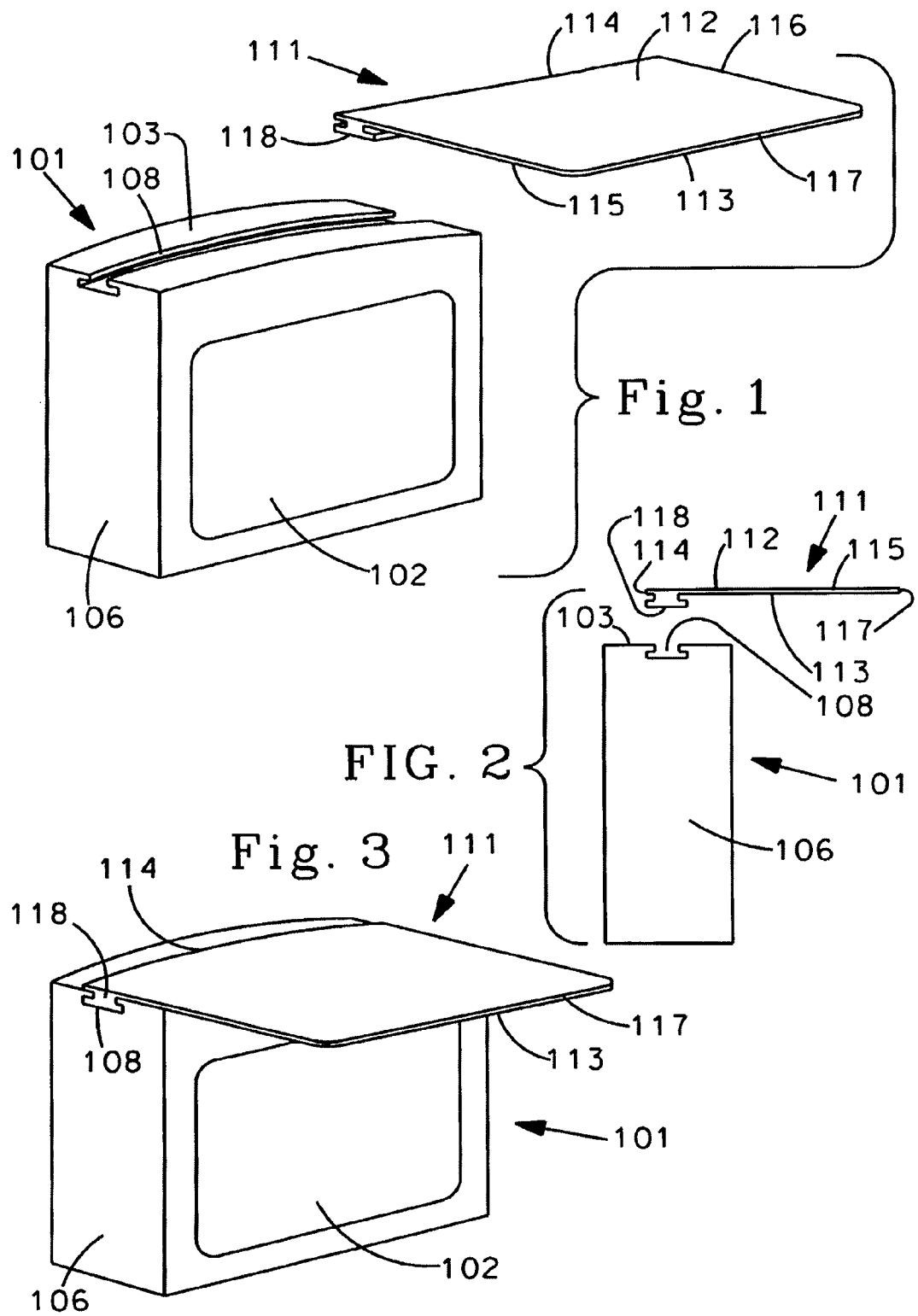

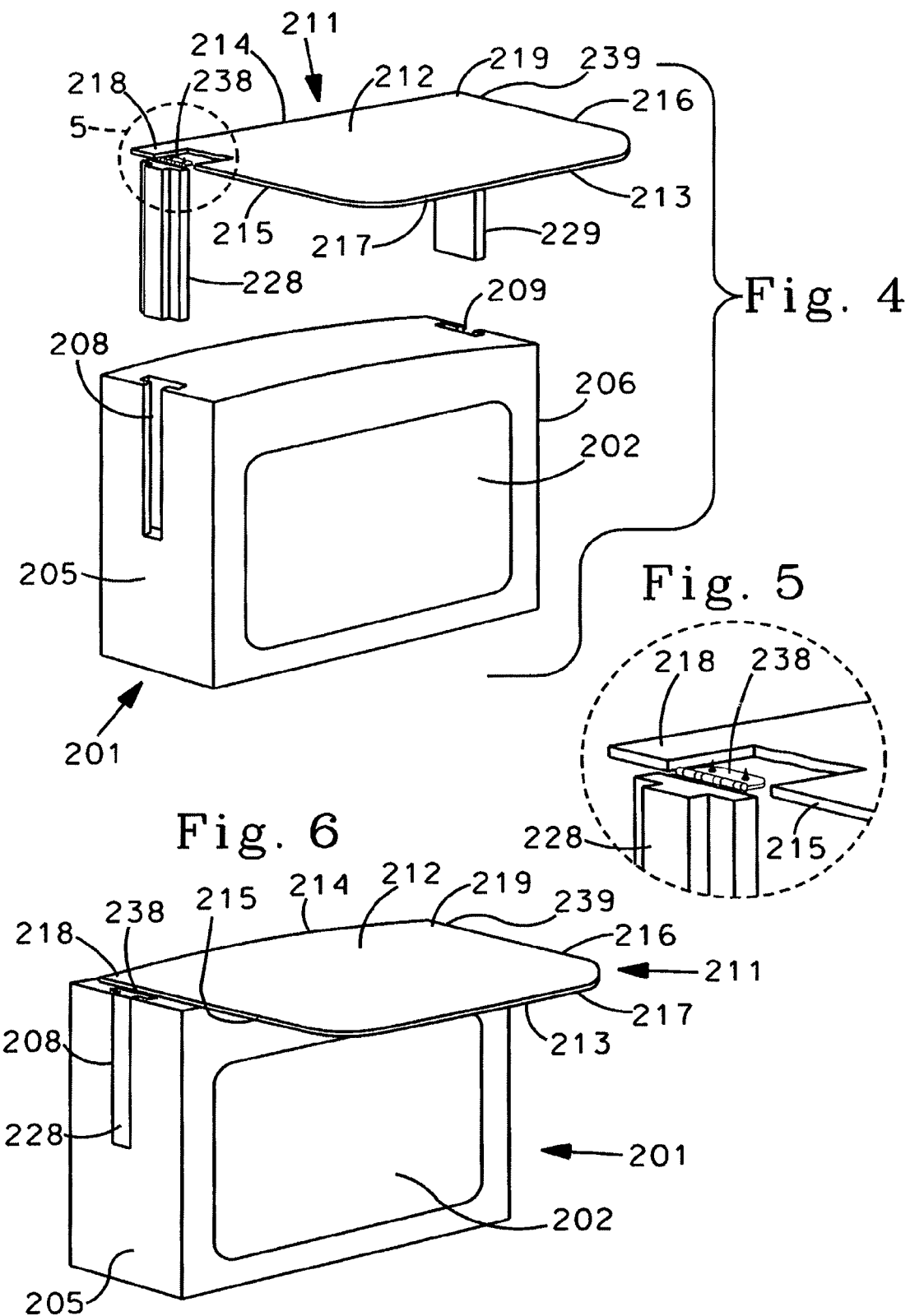

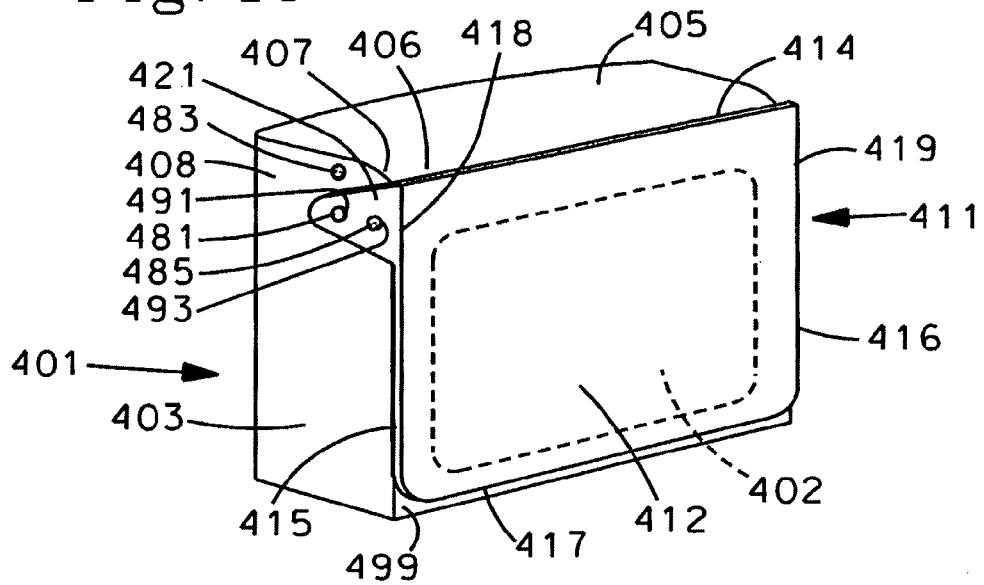
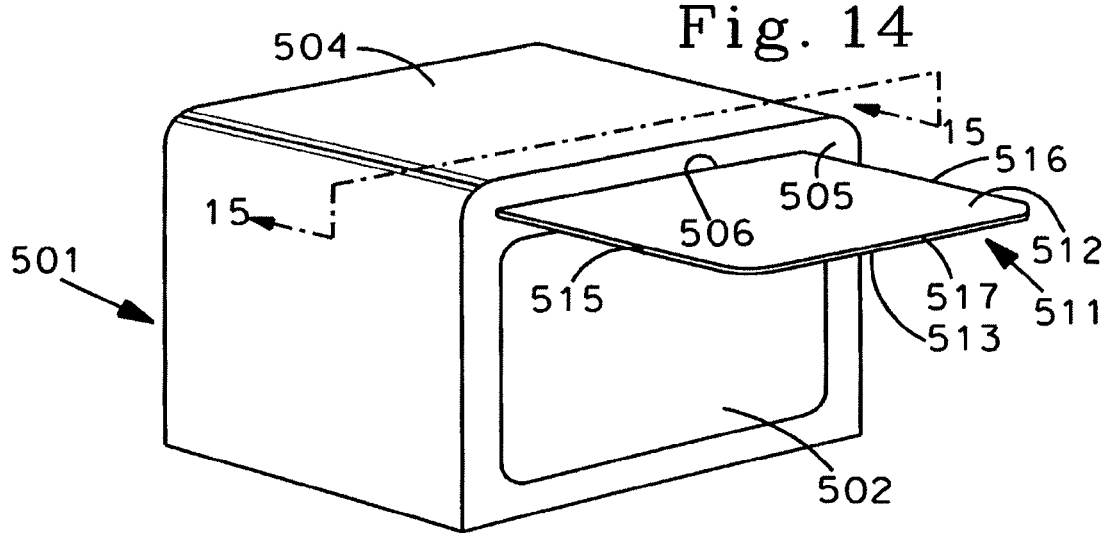
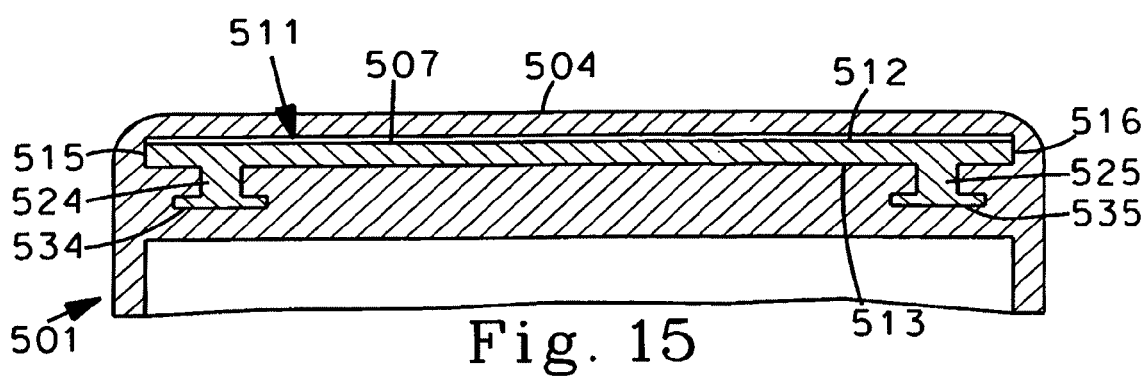

MOUNTING ASSEMBLY FOR A GPS

CROSS-REFERENCE TO RELATED APPLICATION

This application is a divisional of U.S. patent application Ser. No. 13/305,260 (pending), filed Nov. 28, 2011, which is a divisional of U.S. patent application Ser. No. 12/384,355 (abandoned), filed Apr. 3, 2009, the disclosures of which are incorporated herein by reference.

BACKGROUND OF THE INVENTION

1. Field of the Invention

This invention relates to the field of navigation devices or units, especially the Global Positioning System (hereinafter "GPS") devices or units that have a visual display. In particular, it relates to a visor or sunshade that can be a permanent or removable part of a GPS device, or that can be a separate accessory that can be attached to a GPS unit, to improve the viewing of the information that appears on the visual display screen under bright light. Thus, it relates to a visor that has an attachment means to attach itself to GPS units that have a visual display, including portable GPS units that have a visual display. It also relates to a visor that comprises a supplemental antenna to provide improved reception of signals from GPS satellites. It also relates to a method of using such GPS device or visor to improve the viewing of information on the visual display screen and/or the reception of GPS satellite signals, an article of manufacture that provides such GPS device or visor; to the provision with the such GPS device or visor of instructions for use; and/or to methods of doing business that promote the availability and the utility of such GPS unit or visor, articles of manufacture, and methods, etc., to the plurality of people who may need such unit, visor, etc.

2. Description of the Related Art

GPS units or apparatus have become very popular with consumers for use as a navigation aid for movable bodies, such as motor vehicles, automobiles, trucks, motorcycles, boats, planes, and for activities such as hunting, hiking, fishing, camping, street walking, and the like. Some high-priced automobiles, boats, and planes have a GPS unit permanently installed in their control dashboard. However, the portable GPS units that can be temporarily installed are even more widespread. These portable and usually temporarily mountable GPS units can be removed and stored out-of-sight when not in use, or can be transferred to another vehicle, so one unit can be alternatively used in several vehicles. GPS units are commercially available in many models under the brand names of, e.g., Garmin™, Magellan™, Tom Tom™, Mio™, Cobra™, HP™, LG™, and the like.

In general, a portable GPS unit comprises a movable body comprising mainly an antenna, tuned to the frequencies transmitted by the satellites; a position measuring device for determining a self-position of the movable body; an input device for inputting a destination position; a memory device for storing map information and information about the course from the present position to the destination; an optimum course device for evaluating different courses from the present position to the destination by using the map information stored in the memory device and searching for the optimum course by selecting a course, based on some selection criteria, that is the best one among the various evaluated courses, as the optimum course; and a visual display device for providing the user with various information, such as, the present position, a road map that shows the directions toward the destination, the description of the different roads and streets for the present trip, and other information such as turn-by-turn directions, name of the roads, speed of the vehicle, projected time of arrival, and the like; a speaker means to announce some of the information such as the next turn; and a placement means or a mounting means to mount the GPS unit on a location of, e.g., a vehicle, such as on the dashboard or a windshield. Although the display screens for most portable GPS units are fairly small, with diagonal dimension of from about 3.5 cm to about 13 cm, they display a lot of information, from detailed maps with street names and directions for the next turn or the next several turns, and other information, such as speed of the vehicle, projected arrival time, nearby points of interest, such as gas stations, restaurants, hospitals, and the like. Another type of GPS unit comprises many of the functions listed above, but also comprises a mobile or cellular telephone device and/or other computer capabilities, to serve both as a GPS unit and a mobile phone unit and/or as a GPS unit and a personal digital assistant (PDA) unit, such as PDA units from Research in Motion™ Limited, Garmin, Mio, Navman™, Mobile Crossing™, Pharos™, Asus™, and the like.

For easy viewing by the user, portable GPS units are most often mounted on top of the dashboard or on the front windshield of a motor vehicle. In these positions, the display screen can become difficult to view at times, when the GPS device is exposed to bright light, e.g., bright sunlight. U.S. Pat. No. 7,413,233 B1 issued to Jung on Aug. 19, 2008 discloses a special display screen that is placed in tandem with the car sun visor to provide shading but which blocks more of the view of the road. Under bright sunlight that shines on the display screen, the image and information on the display screen of a dash-mounted or windshield-mounted GPS unit can appear dimmed and/or washed out, and the user may loose the visual directions, potentially causing hazardous driving conditions.

The extent of this problem has not been appreciated. Thus, there is a need for a visor or sunshade that has a means for attaching it to the GPS unit and which shields the glare of the bright sunlight from the display screen of said GPS unit, thus allowing a comfortable and clear reading by the driver of the information on said display screen. During night time driving, the lighted display screen of the GPS unit can reflect itself off the front windshield and cause diminished visibility of the road, especially on dark streets or unlit highways. There has been no recognition of this problem. Thus, there is a need for a shade on the GPS screen to block that reflection that appears on the windshield at night to provide the car driver with a good visibility of the road. The invention improves driving safety both during bright sunlight and at night.

The reception of satellite signals by a GPS unit can be improved by the use of an external or supplemental antenna, which can provide a stronger signal reception and/or a faster signal acquisition. A better signal reception can also reduce the risk of losing the signal lock. The performance of an antenna is dependent in part on its physical orientation, which is related to the radiation pattern of the antenna. There are many commercially available supplemental or external GPS antennas that can be purchased from the GPS unit manufacturers, such as Garmin and Magellan, and from GPS accessories manufacturers, such as Gilsson Technologies™, 2576 Barrington Court, Hayward, Calif. 94545. An external or supplemental GPS antenna generally comprises a housing containing an antenna unit that is linked by a coaxial cable to a coaxial connector. The coaxial connector in turn is attached to the external antenna jack of a GPS unit to transfer the signals received by the antenna to the GPS unit. A correct orientation of the antenna is needed for a good reception of satellite signals. A typical GPS antenna is a flat microstrip (or patch) antenna that provides a better reception when it is placed horizontally because satellite signals come from above. When used in a motor vehicle, the supplemental GPS antenna is usually placed horizontally on the roof of the vehicle, attached to the windshield, or placed horizontally on the dashboard, and is connected to the GPS unit by a long cable. There is a need to simplify the hook-up and attachment of the supplemental antenna to the GPS unit, and to maintain the approximately horizontal position for the antenna.

Despite the clear need for driving safety and convenience, there has been no recognition in the art of the problems solved by the invention.

SUMMARY OF THE INVENTION

This invention relates to a GPS device, including a portable GPS device, comprising a GPS unit comprising a visual display screen, a visor (or sunshade or screen shade), and an optional attachment means, as required, to attach the visor to the GPS unit to prevent bright light such as originates from an external source from shining onto the visual display screen of said GPS unit to improve the viewing of the information that is displayed on the display screen. By "visor", it typically means a flat piece of material that can be placed above the GPS display screen, and optionally, additional pieces placed on the two vertical sides of the display screen, to prevent bright light from shining onto the display screen and interfering with the driver's reading of information on said display screen that can cause distraction and driving hazard. Said visor can be a permanent or removable part of said GPS device. Alternatively, said visor can be a separate article that can be attached to a GPS unit, to improve the viewing under bright light of the information on the visual display screen. As used herein, "GPS unit" refers to the basic unit without a visor and "GPS device" refers to a GPS unit with a visor, either attached, or as part of a combination. GPS unit can comprise any device providing a GPS capability that has a viewing screen subject to a bright light, including those devices that have other capabilities.

This invention also relates to a visor for a GPS device, including for a portable GPS device, comprising a GPS unit and a visor that is attached to the upper part of said GPS unit to shield the bright light emitted by the GPS display screen that otherwise can reflect from the front windshield of a motor vehicle during nighttime driving causing reduced visibility of the road and distraction to the viewer, said visor is attached to said GPS unit by an attachment means. Said visor can be a permanent or removable part of said GPS device. Alternatively, said visor can be a separate article that can be attached to a GPS unit, to improve the visibility of the road during nighttime driving. In this invention, the visor for daytime driving can optionally, and desirably, be used as the nighttime shade for the GPS device.

The present invention also relates to a visor that comprises a supplemental antenna, desirably associated with a visor that is parallel to the ground so that the antenna is parallel to the ground, to provide improved reception of signals from the GPS satellites by assuming a near horizontal orientation.

This invention also relates to the method of using such visor to improve the viewing of the visual display screen of GPS devices and/or to improve the nighttime visibility of the road and/or to improve the reception of the satellite signals, when the GPS device is in use. This invention also relates to an article of manufacture that provides such GPS device and/or such visor; to the provision with the GPS device and/or the visor of instructions for use; and wherein such visor can carry an indicia that, e.g., either identifies the visor, describes its use, etc. It is important to provide instructions that indicate the problems to be solved and the improved safety that result from following the instructions to provide the user with an appropriate incentive for using the invention.

In this document, the term "about" is presumed to modify all numerical values, it being understood that exact numerical values are not required unless it is specifically stated.

BRIEF DESCRIPTION OF THE DRAWINGS

FIG. 1 shows an exploded perspective view of an embodiment of a GPS device with a removable visor of the present invention, comprising a GPS unit having a recessed longitudinal groove on its top side and its detached visor, said visor having a long flexible lip at the proximal edge of its bottom face that is a mate for and can be inserted into the indented groove of the GPS unit to attach the visor to the GPS unit;

FIG. 2 is a side view of the GPS unit and the detached removable visor of FIG. 1, showing the recessed groove on the top side of the GPS unit and the mating lip that extends from the bottom face, at the proximal side of the visor;

FIG. 3 is a perspective view of the GPS device of FIG. 1 with the lip of the visor already fully inserted into the groove of the GPS unit to attach the visor to the GPS unit;

FIG. 4 shows an exploded perspective view of an alternative embodiment of a GPS device with a removable visor of the present invention, comprising the GPS unit comprising two vertical recessed flat grooves at its vertical sides, and a visor having two hinged flat stems (or flat shafts) that mate with and can be inserted into the vertical grooves of the GPS unit to attach the visor to the GPS unit;

FIG. 5 is the magnification of the cut away area of FIG. 4 to provide an enlarged view of the hinges that permit the said flat stems to be flattened against the visor;

FIG. 6 is a perspective view of the GPS device of FIG. 4 with the stems of the visor already secured into the grooves of the GPS unit to attach the visor to the GPS unit;

FIG. 13 is a perspective view of the GPS device of FIG. 10 with the visor being in the closed position to protect the visual display screen;

FIG. 14 is a perspective view of an embodiment of a GPS device with a permanently attached, retractable visor of the present invention, with the visor being in the open position;

FIG. 15 is a partial cross-sectional view of the GPS device of FIG. 14, taken along the line 15-15, showing the part of the top side of said GPS device having the housing situated underneath the top side, and two tracks that allow the mating stops of the visor to move along the tracks in order for the visor to take either the open or closed position;

Figure 7:
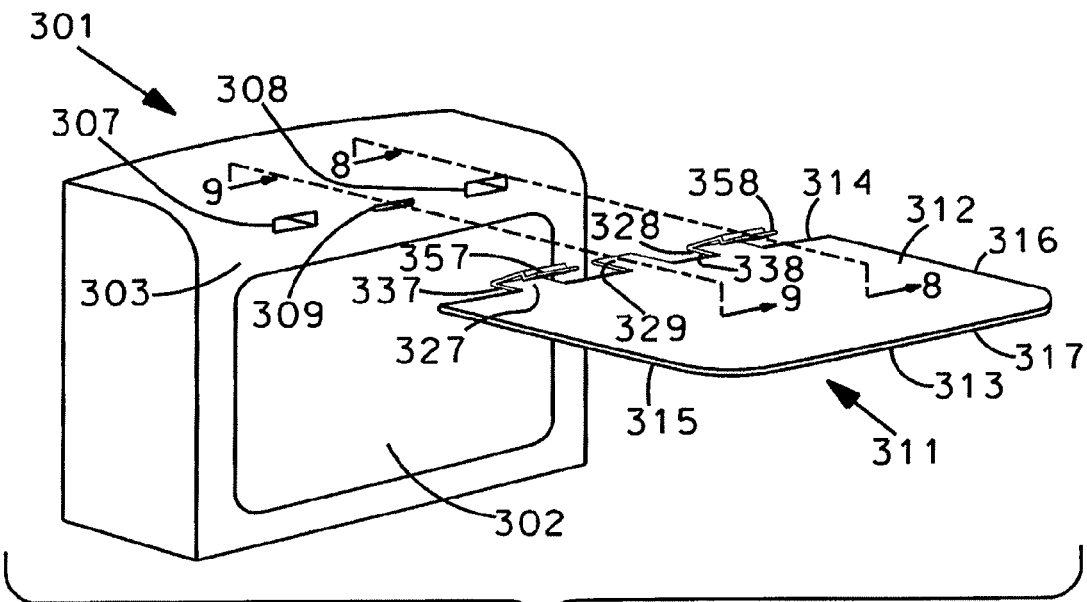
FIG. 7 is an exploded perspective view of an alternative embodiment of a GPS device with a removable visor of the present invention, comprising a GPS unit having three hollow receptacles on its top front side, and a visor having two clips and a flat guide that can be inserted and snugly fitted into the mating receptacles of the GPS unit to affix the visor to the GPS unit.

These drawings are not drawn to scale and are intended for illustrative purposes only.

DETAILED DESCRIPTION OF THE INVENTION

This invention relates to a GPS device that is an improvement over existing GPS units, including a portable GPS device, comprising a GPS unit comprising a visual display screen, and a visor or a sunshade or a screen shade (hereinafter "visor") that is attached to said GPS unit to prevent bright light such as originates from an external source from shining onto the visual display screen, hereinafter also referred to as "display screen", said visor typically being attached to said GPS unit by an attachment means. By "visor" it typically means a flat piece of material that can be placed above the GPS display screen, and optionally, additional pieces placed on the two vertical sides of the display screen, to prevent bright light from shining onto the display screen and interfering with the driver's viewing of information on said display screen that can cause distraction and thus create a driving hazard. Said bright light can be bright sunlight or bright artificial light that shines onto said visual display screen from above and/or from a side of said display screen. Said visor can be a permanent or a removable part of the GPS device, with the removable visor being temporarily attached to the GPS unit when needed. Alternatively, said visor can be a separate article that can be permanently or temporarily attached to a GPS unit, to improve the viewing of the display screen by a user under bright light of the information on the visual display screen. For the purpose of this invention, a "GPS unit" is any GPS apparatus, including any commercially available GPS unit, which does not have a visor, while the term "GPS device" designates a GPS apparatus that comprises a removable or permanent visor. For the purpose of this invention, "GPS unit" also includes a GPS unit with mobile or cellular telephone capability and/or other computer capabilities, to serve both as a GPS unit and a mobile phone unit and/or a personal digital assistant (PDA) unit. This invention also relates to the method of using such GPS device or visor to improve the viewing of the information that is displayed on the visual display screen of GPS units/devices and/or the improvement of the view through a windshield at night.

Thus, in another embodiment of the present invention, the sun visor can be used as a nighttime shade for the GPS device to eliminate or reduce the reflection of the lighted display screen from surfaces around the display screen, including the front windshield of a motor vehicle, in order to improve the road visibility and/or eliminate the distraction caused by the reflection, especially on dark streets or unlit highways. Thus this invention also relates to the method of using such visor to improve the viewing of the information that is displayed on the visual display screen of GPS devices and/or to improve the nighttime visibility of the road, when the GPS device is in use. Again, it is surprising that the problems found by applicants have not been addressed heretofore. The invention makes a major contribution to highway safety.

Thus, in one aspect of this invention there is provided a GPS device that comprises a GPS unit comprising a visual display screen, a visor, and an optional attachment means, as required, to attach the visor to the GPS unit to shield any bright light from shining onto the display screen of said GPS unit, to improve the viewing of the information that is displayed on the display screen. In this aspect, the visor is an integral part of the GPS device as sold, with the visor being attached to the GPS unit using an attachment means. In another embodiment, the visor can also eliminate or reduce the reflection of the lighted display screen from the motor vehicle's front windshield in nighttime driving that can cause reduced visibility of the road and distraction to the viewer.

The visor of the present invention can have any suitable shape such as rectangular, square, semicircular, semi-elliptic, semi-oval, and the like. Typically, the visor has a generally rectangular or square configuration having four edges, comprising a proximal edge that is closest to the GPS unit when the visor is attached to the GPS unit, two lateral edges that are adjacent to the proximal edge and a distal edge that is farthest away from the GPS unit. In a desirable embodiment, the visor has rounded corners at the ends of the distal edge. It is desirable to avoid sharp edges for safety reasons. Similarly, for safety reasons, soft flexible visors are desirable. The visor comprises a top face that is oriented away from the GPS unit, and a bottom face that is close to the display screen of the GPS unit. The present invention provides visors of different dimensions that fit the different sizes of the various GPS units. Since the top side of most common commercial GPS units has a length of from about 8 cm to about 17 cm, and the length of the top side of a mobile telephone unit, smart phone unit, and personal digital assistant (PDA) unit with GPS capability is generally from about 3 cm to about 20 cm, the length of the proximal edge of the visor can vary accordingly, from a minimum of from about 3 cm to about 8 cm to a maximum of from about 15 cm to about 20 cm. The width of the visor, which is the distance between the proximal edge and the distal edge, can be either about 3 cm, about 5 cm, about 6 cm, about 7 cm, about 8 cm, about 9 cm, about 10 cm, about 12 cm, or about 15 cm. The visor has a thickness of from a minimum of from about 0.5 mm to about 1 mm to a maximum of from about 5 mm to about 15 mm. The visor of the present invention can optionally comprise side shields that are, e.g., vertically folded downward from the lateral sides of the visor, said side shields can be folded against the bottom face using, e.g., hinges at the edge of the lateral sides for storage.

The visor can be made of material such as plastic film, polymeric film, molded plastic, polymeric foam, paper, cardboard, laminated materials, composite material, wood, and the like. In a desirable embodiment, the visor is flexible and is made of a resilient material. Flexible visors are desirable so they can be adapted to different shapes of the top side of the different GPS units. Desirable materials for visor are plastics that can include thermoplastic polymer, such as polypropylene, polyethylene, polystyrene, polycarbonate, polymethyl methacrylate, ethylene vinyl acetate copolymers, acrylate-modified ethylene vinyl acetate polymers, nylon, polyvinyl chloride, and combinations thereof.

In one embodiment, the visor faces, especially the top face, have a matte finish, not shiny or glossy, to minimize light reflection that can reach the driver's eyes and disturb the viewing of the information that is displayed on the display screen and the road. In desirable embodiments, the visor faces, especially the top face, can be smooth, coarse, rough, finely granular, finely textured, felted, flocked, velvety, and the like. The visor is typically made of opaque, not transparent, material to minimize the transmission of light to the display screen of the GPS unit. The visor can have any color, but is typically a dark color such as black, dark blue, dark red, dark purple, crimson, dark green, and the like, including combinations of such colors. Visors with ornamental designs can be desirable.

In a useful embodiment, the visor of the present invention can be removed from the GPS unit for storage when it is not needed, said visor being temporarily attached to the GPS unit when needed, using an attachment means. Non-limiting examples of attachment means that are useful in the present invention for attaching the removable visor to the GPS unit are one or more lip and groove pairs, one or more interlocking rib-and-groove Ziploc™-type connectors, one or more clip and receptacle pairs, loop and hook mating Velcro®-type fasteners, and the like. The interlocking rib-and-groove Ziploc™-type connectors or male and female connectors are described in, e.g., U.S. Pat. No. 3,338,284 issued Aug. 29, 1967 to Ausnit; U.S. Pat. No. 4,263,079 issued Apr. 21, 1981 to Sutrina et al.; U.S. Pat. No. 4,363,345 issued Dec. 14, 1982 to Scheibner; U.S. Pat. No. 5,070,584 issued Dec. 10, 1991 to Dais et al.; U.S. Pat. No. 5,140,727 issued Aug. 25, 1992 to Dais et al.; U.S. Pat. No. 5,647,100 issued Jul. 15, 1997 to Porchia et al.; and the references cited therein. The Velcro-type fasteners are described in, e.g., U.S. Pat. No. 4,984,339 issued Jan. 15, 1991 to Provost et al; U.S. Pat. No. 5,339,499 issued Aug. 23, 1994 to Kennedy et al.; U.S. Pat. No. 5,647,100 issued Jul. 15, 1997 to Porchia et al.; U.S. Pat. No. 5,755,016 issued May 26, 1998 to Provost; and the references cited therein. Non-limiting examples of loop and hook mating Velcro-type fasteners include Velcro strips, and Sticky Back™ Velcro strips that have an adhesive layer on their backside, said adhesive layer is protected by a release paper strip to prevent the adhesive from prematurely sticking to a surface other than the intended surface, said Velcro strips are available from, e.g., Velcro USA Inc., Manchester, N.H. 03108. Another example of an attachment means is the GPS placement means or mounting means that is used to mount the GPS unit to, e.g., a location in a vehicle. The visor is also attached to a part of the placement means and is positioned in such as way that the visor can shield the bright light from shining onto the visual display screen of the GPS unit when the GPS unit is mounted in the mounting means. Non-limiting examples of GPS placement means or mounting means useful in the present invention are suction cup mount, non-skid friction mount, dashboard mount, maritime mount, and the like. A non-limiting example of a part of the mount that can be used to attach the visor is the cradle of the mount that holds the GPS unit.

In another embodiment, the visor of the present invention is an integral part of the GPS unit and is not removable from the GPS unit, with the visor being attached to the GPS unit using an attachment means. Non-limiting examples of attachment means that are useful in the present invention for attaching the non-removable visor to the GPS unit include hinges that connect the visor to the GPS unit, or a housing or slot in the GPS unit to hold and retain a retractable visor, where it is intended that the visor stay associated with the GPS unit. Hinge means allow one to orient the visor in a more horizontal configuration. The visor can be molded into the case of the GPS unit, but that makes the unit more awkward.

In another aspect of the present invention there is provided a GPS visor set for a GPS unit comprising a visor and an attachment means that is used to attach the visor to the GPS unit. A non-limiting example of an attachment means comprises a strap with Velcro sides, said strap is attached to the visor and can tightly wrap around the sides of a GPS unit when the two Velcro ends firmly join together in order to attach the visor to the GPS unit. A non-limiting example of a suitable Velcro strap is the One-Wrap Straps® that are available from Velcro USA Inc., Manchester, N.H. 03108. The strap can be an elastic band with mating Velcro-type strips that are stitched or otherwise attached to the opposite sides at the ends of the strap, said strap is stretched and attached to the visor and thus can tightly wrap around the sides of a GPS unit when the two Velcro ends firmly join together, in order to attach the visor to the GPS unit. Non-limiting example of suitable elastic materials that can be used to construct the strap herein are knit elastic bands of different widths that are available from Dyno Merchandise, Pompano Beach, Fla. 33064. Another non-limiting limiting example of an attachment means that is useful in the present invention is one or more of the various types of plastic releasable cable ties with suitable widths and lengths. These releasable straps typically comprises an elongate strap and a locking head with an opening that receives the free end of the strap, said head having a mechanism to lock the strap tightly in place, when the strap is wrapped around an object, such as a bundle of electric cables or the sides of a GPS unit, and pulled tightly through the head to tie the strap around the object. The releasable ties are described in, e.g., U.S. Pat. No. 3,908,233 issued Sep. 30, 1975 to Caveney et al.; U.S. Pat. No. 3,991,444 issued Nov. 16, 1976 to Bailey; U.S. Pat. No. 4,236,280 issued Dec. 2, 1980 to Kreiseder; U.S. Pat. No. 5,193,250 issued Mar. 16, 1993 to Caveney; U.S. Pat. No. 5,414,904 issued May 16, 1995 to Sampson; U.S. Pat. No. 6,185,791 B1, issued Feb. 13, 2001 to Khokhar; and the references cited therein. Other non-limiting examples of the attachment means including one or more mating Velcro strips, one or more Ziploc strips, or similar connectors, wherein one member or more members of a connector is permanently affixed to the GPS unit by an adhesive layer, while one or more mating members of the connector is attached to the visor, e.g., by stitching or adhesive, and the visor is then temporarily attached to the GPS unit. Since commercially available GPS units can have many designs, some of which can have an on/off button and other switches located at the top side of the GPS unit, the removable visor of the present invention allows for appropriate modifications by either providing openings that allow the user to access those buttons and switches when using, or before using the visor, or making the visor from materials that permit removing portions to form such openings.

In another embodiment, the visor of the present invention can be designed to be used as a protecting cover for the display screen.

The present invention also relates to a visor that comprises a supplemental antenna to provide an improved reception of signals from the GPS satellites, desirably by assuming a near horizontal orientation. In this aspect of the invention, the visor serves as the housing for a small and flat GPS antenna such as a microstrip (or patch) antenna that then approximately assumes the same orientation of the visor. Since in use the visor is normally set in a near horizontal position, the antenna also assumes a near horizontal orientation for a good reception of the satellite signals that are emitted from up high. This supplemental signal reception is particularly useful for GPS units that comprise a thin body and for very thin cell phones, which require that the internal antenna be oriented more or less in a vertical position that may not be the best orientation for many usage conditions. An antenna in a near horizontal orientation is particularly advantageous, e.g., in a city setting having rows of tall buildings that allow mainly satellite signals that come from above, and not horizontally. When the visor is an integral part of the GPS unit and is not removable from the GPS unit, the antenna is linked internally to the GPS unit, and can optionally be the sole antenna of the GPS device. When the visor is removable from the GPS unit, the visor also comprises a short coaxial antenna cable with a coaxial connector to connect the antenna to an external antenna jack of a GPS unit, to transfer the signals received by the external antenna of the visor to the GPS unit, and therefore, the bulkiness of a long antenna cable is avoided. The current invention thus provides a compact arrangement of the external antenna with the desired near-horizontal orientation when in use. The provision of an antenna in a visor that can be easily replaced allows for upgrading the antenna easily. GPS antennae that are useful in the present invention can have a variety of configuration, from a coiled wire encapsulated in a solid housing to miniature GPS patch antennae and GPS microstrip antennae, as described in, e.g., U.S. Pat. No. 5,943, 018 issued Aug. 24, 1999 to Miller; U.S. Pat. No. 5,245,745 issued Sep. 21, 1993 to Jensen et al.; U.S. Pat. No. 5,272,485 issued Dec. 21, 1993 to Mason et al.; U.S. Pat. No. 6,100,855 issued Aug. 8, 2000 to Vinson et al.; U.S. Pat. No. 6,842,145 issued Jan. 11, 2005 and U.S. Pat. No. 6,919,844 issued Jul. 19, 2005, both to Ryken, Jr. et al. and the references cited therein. Compact and small dielectric patch antennae that are very suitable for use in the visor of the present invention are available from, e.g., Toko America, Inc., 1250 Feehanville Drive, Mount Prospect, Ill. 60056 or Alpha Micro Components Ltd, Springfield House, Cranes Road, Sherborne St John, Hants, RG24 9LJ, UK. For instance, the AP12-A GPS ceramic patch antenna that has approximate dimensions of 14 mm.times.14 mm.times.6 mm (height) can be readily enclosed in a GPS visor of the present invention.

The present invention also relates to a GPS visor set for a GPS unit comprising a visor; an attachment means that is used to attach the visor to the GPS unit; and a supplemental GPS antenna that can connect to a GPS unit comprising an external antenna jack to provide an improved reception of GPS satellite signals.

The present invention also relates to a method for improving the viewing of the information on the display screen of a GPS unit under bright light, e.g., by temporarily or permanently placing a visor above the display screen of the GPS unit or by appropriately attaching the visor(s) to the GPS unit by an attachment means, said visor being as described hereinabove. The visor optionally comprises side shields that are placed at the two vertical sides of the display screen to reduce bright light that shines to the sides of the display screen.

The present invention also importantly relates to a method of using the visor for eliminating or reducing the reflection of the lighted display screen of a GPS unit from the automobile's front windshield in nighttime driving. This reflection can create a significant safety hazard.

The present invention also relates to a method of using a visor that comprises one or more supplemental antennae to provide a stronger reception and/or a faster acquisition of satellite GPS signals. E.g., antennae can be positioned so as to maximize reception from satellites near the horizon as well as those more directly overhead.

The present invention also relates to an article of manufacture comprising a GPS device comprising a GPS unit, a visor, an attachment means for temporarily or permanently attaching the visor to the GPS unit, and optionally an external GPS antenna, that are all described hereinabove, optionally in association with instructions for use the visor to improve the viewing the information that is displayed on the display screen of a GPS unit under bright light and/or to eliminate or reduce the reflection of the lighted display screen of the GPS unit from the motor vehicle's front windshield in nighttime driving and/or to provide a stronger reception and/or a faster acquisition of satellite GPS signals. Instructions which explicitly state the problems that will be solved by using the invention improve the chances that the invention will be used properly to avoid the safety problems. The present invention also relates to an article of manufacture comprising a visor set comprising a visor and an attachment means for temporarily or permanently attaching the visor to a GPS unit, and optionally an external GPS antenna that can connect to a GPS unit comprising an external antenna jack to provide an improved reception of GPS satellite signals, optionally in association with instructions for use of the visor to improve the viewing of the display screen of a GPS unit under bright light and/or to eliminate or reduce the reflection of the lighted display screen of the GPS unit from the motor vehicle's front windshield in nighttime driving and/or to obtain a stronger reception and/or a faster acquisition of satellite GPS signals.

The present invention also relates to the association of a set of instructions for use with the visor, the GPS device, the method, or the article of manufacture described hereinabove. The set of instructions desirably provides the information on how to use the visor to obtain a better view of the information that appears on the visual display screen under bright light and/or a better view of the road during nighttime driving due to the absence of the reflection of the lighted display screen on the windshield and/or to obtain a stronger reception and/or a faster acquisition of satellite GPS signals. The set of instructions can be printed, e.g., on one or more of: the package, the accompanying instruction flyer or booklet, and/or communicated via print and/or electronic mass media, e.g., newspapers, magazines, radio, television, internet, circulars, and the like. The instructions can be in words, or illustrative images and/or icons including in combination with words.

This invention further relates to a visor set, a GPS device comprising a visor, and/or an article of manufacture comprising said visor set or said GPS device comprising a visor, wherein the visor carrying one or more indicia showing, e.g., a logo, emblem, symbol, motif, sign, figure, mark, icon, decoration, pictogram, insignia, design, image, and/or brand name, said indicia can be in light color, such as pastel or white, dark color, multicolor, or mixtures thereof.

Embodiments of the invention will now be described by way of example hereinafter with reference to the drawings. Similar reference numbers denote corresponding features throughout the drawings. The elements of one embodiment can be combined with those of other elements, or can be used alone.

FIG. 1 shows an exploded perspective view of an embodiment of a GPS device with a removable visor of the present invention, comprising the GPS unit 101 and the removable visor 111. The GPS unit 101 comprises the display screen 102, the vertical side 106, and a recessed longitudinal groove 108 on the top side 103 of the GPS unit 101, said indented groove 108 being a part of the attachment means to attach the removable visor 111 to the GPS unit 101. The removable visor 111 comprises the top face 112, the bottom face 113, the proximal edge 114 that is closest to the GPS unit 101 when the visor 111 is attached to the GPS unit 101, two lateral edges 115 and 116 that are adjacent to the proximal edge 114, and the distal edge 117 that is farthest away from the GPS unit 101, with the visor further having the long flexible lip 118 that extends from the bottom face 113 of the visor 111 along the proximal edge 114 as the other part of the attachment means, said lip 118 can be inserted and snugly fitted into the groove 108 of the GPS unit 101 to attach the visor 111 to the GPS unit 101. Visor 111 can be removed from GPS unit 101 when not needed by the user by moving lip 118 out of groove 108.

FIG. 2 is a side view of the GPS unit 101 and the detached removable visor 111 of FIG. 1, showing the side 106 of said GPS unit 101 and the recessed groove 108 on the top side 103 of the GPS unit 101, and the edge 115 and the lip 118 that extends from the bottom face 113 at the proximal edge 114 of the visor 111.

FIG. 3 is a perspective view of the GPS device of FIG. 1 with the lip 118 of the visor 111 already fully inserted into the groove 108 of GPS unit 101.

FIG. 4 shows an exploded perspective view of an alternative embodiment of a GPS device with a removable visor of the present invention, comprising the GPS unit 201 and the visor 211. The GPS unit 201 comprises the display screen 202 and two vertical recessed flat grooves 208 and 209 at its vertical sides 205 and 206, said grooves 208 and 209 being a part of the attachment means to attach the removable visor 211 to the GPS unit 201. The visor 211 comprises the top face 212, the bottom face 213, the proximal edge 214 that is closest to the GPS unit 201 when the visor 211 is attached to the GPS unit 201, two lateral edges 215 and 216 that are adjacent to the proximal side 214, and the distal edge 217 that is farthest away from the GPS unit 201. The visor further comprises two hinged flat stems (or flat shafts) 228 and 229 that are attached near the ends 218 and 219 of the proximal edge 214 via hinges 238 and 239 along edges 215 and 216, said flat stems 228 and 229 being the other part of the attachment means, said hinges 238 and 239 allow the stems 228 and 229 either to assume approximately perpendicular positions with respect to the bottom face 213 such that stem 228 and 229 can be inserted and snugly fitted into the vertical grooves 208 and 209 of the GPS unit 201 to attach the visor 211 to the GPS unit 201, or to be folded flatly next to the bottom face 213 parallel to the proximal side 214, in the same manner as the two temples of a pair of eye glasses fold next to the glasses' lens for storage. The circle area 5 of the visor 211 is partly cut away near the end 218 of the proximal side 214 to show the hinge 238.

FIG. 5 is the magnification of the cut away area 5 of FIG. 4 to provide an enlarged view of the hinge 238 that permit the said flat stems to be flattened against the bottom face 213 of visor 211.

FIG. 6 is a perspective view of the GPS device of FIG. 4 with the stems 228 and 229 of the visor already secured into the grooves 208 and 209 of the GPS unit 201.

FIG. 7 is an exploded perspective view of an alternative embodiment of a GPS device with a removable visor of the present invention, comprising the GPS unit 301 and the visor 311. The GPS unit 301 comprises the display screen 302 and three hollow receptacles 307, 308, and 309 at the top front side 303 of the GPS unit, with the receptacles 307, 308, and 309 being a part of the attachment means to attach the removable visor 311 to the GPS unit 301. The visor 311 comprises the top face 312, the bottom face 313, the proximal edge 314 that is closest to the front 303 of the GPS unit 301 when the visor 311 is attached to the GPS unit 301, two lateral edges 315 and 316 that are adjacent to the proximal edge 314, and the distal edge 317 that is farthest away from the GPS unit 301, with the visor further having two mating clips 327 and 328, and a flat mating guide 329 as the other part of the attachment means, said mating clips 327 and 328 and said flat guide 329 being attached to the proximal edge 314, or as extensions of the proximal edge 314, in positions that allow the clips 327 and 328 and the guide 329 to be inserted and snugly fitted into the mating receptacles 307, 308, and 309, respectively, of the GPS unit 301 to attach the visor 311 to the GPS unit 301.

Figure 8:
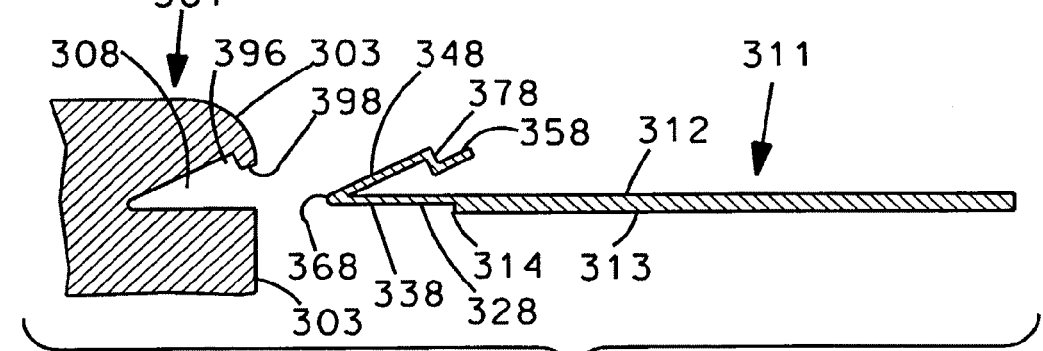
FIG. 8 is a cross-sectional view of the mating portions of the GPS unit of FIG. 7 and its visor showing a side view of a clip at its proximal edge, and the mating portion of the GPS unit with the corresponding hollow receptacle at its top front side, taken along the line 8-8 of FIG. 7.

FIG. 8 is a cross-sectional view of visor 311 with clip 327 extended from its proximal edge 314, and the mating hollow receptacle 308 at the top front side 303 of the GPS unit 301, taken along the line 8-8 of FIG. 7. (Clip 327 and receptacle 307 have the same arrangement.) Clip 328 (and 327) is made of a resilient material such as plastic or metal so that it is springy such that the lever 348 (347 for 327) can be pressed close to the main member 338 (337 for 327) by pivoting around the tip 368 (tip 367 for 327). The lever 348 (347 for 327) can also be pressed close to the main member 338 (337 for 327) by pressing the handle 358 (357 for 327). When clip 328 is inserted into the receptacle 308, the upper tip 398 of receptacle 308 presses on lever 348 which bends down close to the main member 338 and allows clip 328 to enter the receptacle 308. Once clip 328 is completely inserted into receptacle 308, lever 348 rebounds and is locked inside receptacle 308 by the notch 378 that is latched to the notch 396 of the opening 398. Clip 327 can be similarly locked into receptacle 307 and the latch 329 inserted into the receptacle 309, so that visor 311 is securely affixed to the GPS unit 301. Visor 311 can be removed from GPS unit 301 for storage by unlocking clip 327 from receptacle 307, and clip 328 from receptacle 308, by pressing handles 357 and 358 close to the main members 337 and 338, respectively, with the user's thumbs and fingers and pulling clips 327 and 328 from the receptacles 307 and 308.

Figure 9:
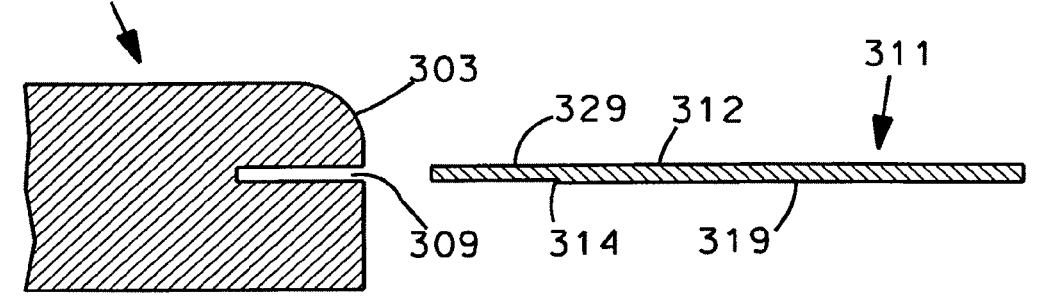
FIG. 9 is a cross-sectional view of the mating portions of the visor with the flat guide at its proximal edge, and the GPS unit with the corresponding hollow receptacle at its top front side, taken along the line 9-9 of FIG. 7.

FIG. 9 is a cross-sectional view of visor 311 with the flat guide 329 extended from its proximal edge 314 and the mating hollow receptacle 309 at the top front side 303 of the GPS unit 301, taken along the line 9-9 of FIG. 7. The flat guide 329 does not have a locking mechanism like clips 327 and 328, and is used to further secure visor 311 to GPS 301.

Figure 10:
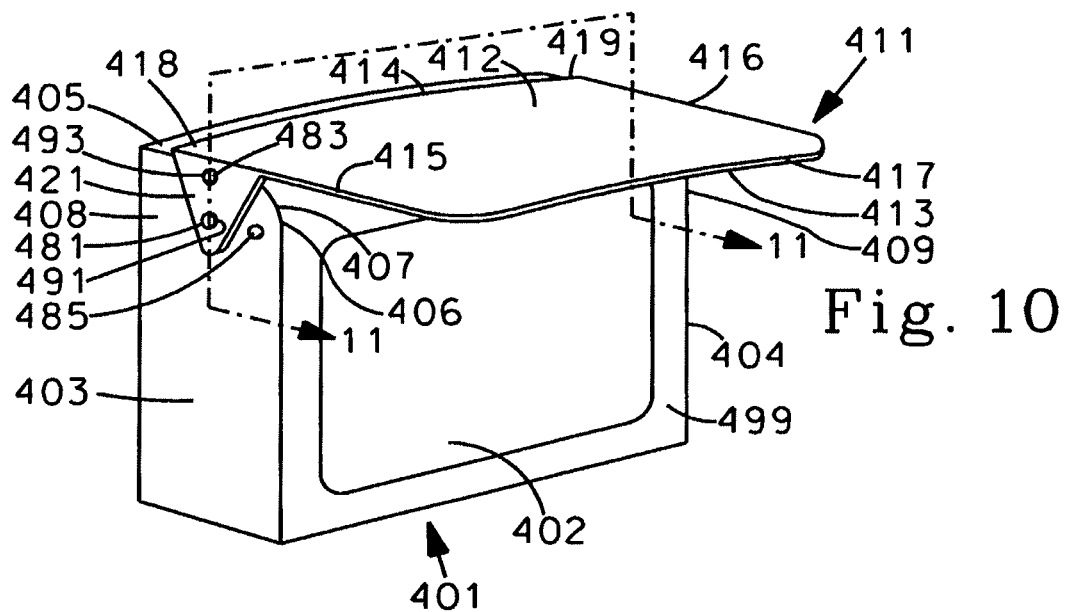
FIG. 10 is a perspective view of an embodiment of a GPS device with a permanently attached visor of the present invention, with a hinge to permit the visor to swing from a closed position in which the visual display screen cannot be viewed to an open position in which the visual display screen can be viewed, the visor being in the open position.

FIG. 10 is a perspective view of an embodiment of a GPS device with a permanently attached visor of the present invention, comprising the GPS unit 401 and the movable visor 411, with hinges to permit the visor to swing from a closed position in which the display screen cannot be viewed to an open position in which the display screen can be viewed, the visor being in the open position. The GPS unit 401 comprises a front side 499 comprising the display screen 402, two vertical sides 403 and 404, the top side 405, and the curved transition portion 406 that joins the top side 405 and the front side 499, said vertical side 403 having the a portion of the top end designated 408, said top end portion 408 having a protruding cylindrical post 481, a semispherical protrusion member 483 that is situated above post 481, and a semispherical protrusion member 485 that is situated at the same level but toward the front side 499 with respect to post 481, with the distances 481-483 and 481-485 being approximately equal, and similarly said vertical side 404 having a portion of the top end designated 409, said top end portion 409 having a protruding cylindrical post 482 (hidden), a semispherical protrusion member 484 (hidden) that is situated above post 482, and a semispherical protrusion member 486 (hidden) that is situated at the same level but toward the front side 499 with respect to post 482, with the distances 482-484 and 482-486 being approximately equal, the top transition portion of the front side 406 has a quarter-cylindrical curvature 407 having the 481-482 center line as its central axis (said 481-482 center line is designated as 487 center line in FIG. 11), with cylindrical posts 481 and 482 serving as a part of the attachment means to permanently attach the movable visor 411 to the GPS unit 401, said top portion of the transition portion 406 intersects the top end 408 at the end of the quarter-circle 407. The visor 411 comprises the top face 412, the bottom face 413, the proximal edge 414 that is closest to the GPS unit 401, two lateral edges 415 and 416 that are adjacent to the proximal edge 414, and the distal edge 417 that is farthest away from the GPS unit 401, with the visor further having two flat triangular sections 421 and 422 that are vertically bent at the ends 418 and 419 of edge 414 along edges 415 and 416 respectively such that triangular section 421 partially covers the top end portion 408 of the GPS unit 401 and triangular section 422 partially covers the top end portion 409 of the GPS unit 401; said triangular section 421 has two cylindrical apertures 491 and 493 with said aperture 491 snugly fitting around the protruding cylindrical post 481 of the top end 408 of the GPS unit 401 to form the 491/481 hinge and said aperture 493 snugly fitting around the semispherical protrusion member 483 at the top end side portion 408 of the GPS unit 401 when the visor is horizontal and around the protrusion member 485 when the visor is vertical, with the distance between the centers of 491-493 and the distance between the centers of 481-483 being approximately equal, and said triangular section 422 has two cylindrical apertures 492 and 494 with said aperture 492 snugly fitting around the protruding cylindrical post 482 of the top end portion 409 of the GPS unit 401 to form the 492/482 hinge, and said aperture 494 snugly fitting around the semispherical protrusion member 484 of the top end 409 of the GPS unit 401 when the visor is horizontal and around the protrusion member 485 when the visor is vertical, with the distance between the centers of 492-494 and the distance between the centers of 482-484 being approximately equal, and said protrusion members 483 and 484 thus locking the visor 411 in the open position, with cylindrical apertures 491 and 492 thus serving as the other part of the attachment means. Triangular sections 421 and 422 can pivot around the protruding cylindrical hinges 491/481 and 492/482, respectively, to allow the visor 411 to swivel with respect to the vertical sides 403 and 404 to assume the open position when apertures 493 and 494 latch in over the semispherical protrusion members 483 and 484, respectively, and allow the visor 411 to assume the closed position when apertures 493 and 494 latch in over the semispherical protrusion members 485 and 486, respectively. The visor 411 can have dimensions that allow said visor 411 to fully cover the front face 499 of the GPS unit 401 to provide protection for the display screen 402 of the GPS 401 when said visor 411 is in the close position.

Figure 11:
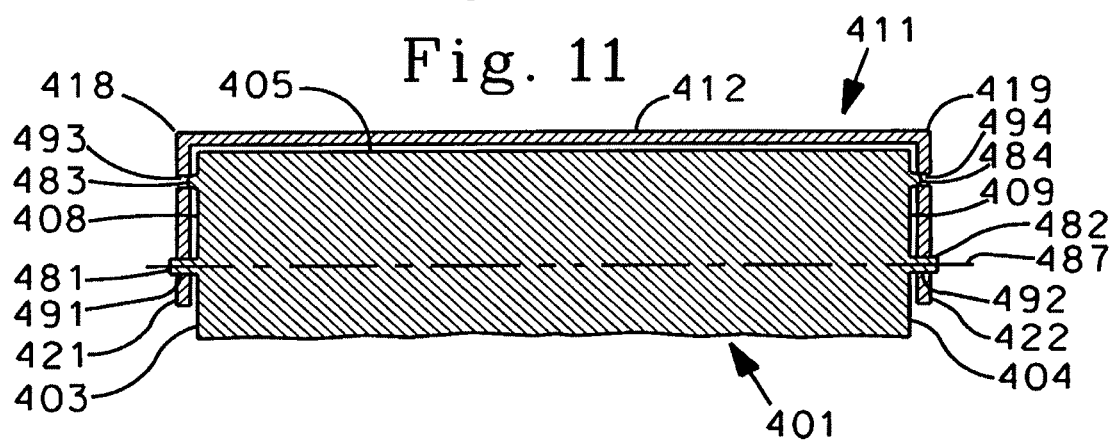
FIG. 11 is a cross-sectional view of the GPS device of FIG. 10, taken along the line 11-11, with the visor being in the open position.

FIG. 11 is a partial cross-sectional view of the GPS device of FIG. 10, taken along the line 11-11, with the visor being in the open position, showing the fitting of the aperture 491 around the protruding cylindrical post 481, the fitting of the aperture 492 around the protruding cylindrical post 482, the fitting of the aperture 493 over the semispherical protrusion member 483, and the fitting of the aperture 494 over the semispherical protrusion member 484, and the 481-482 center line, which is designated as 487 center line.

Figure 12:
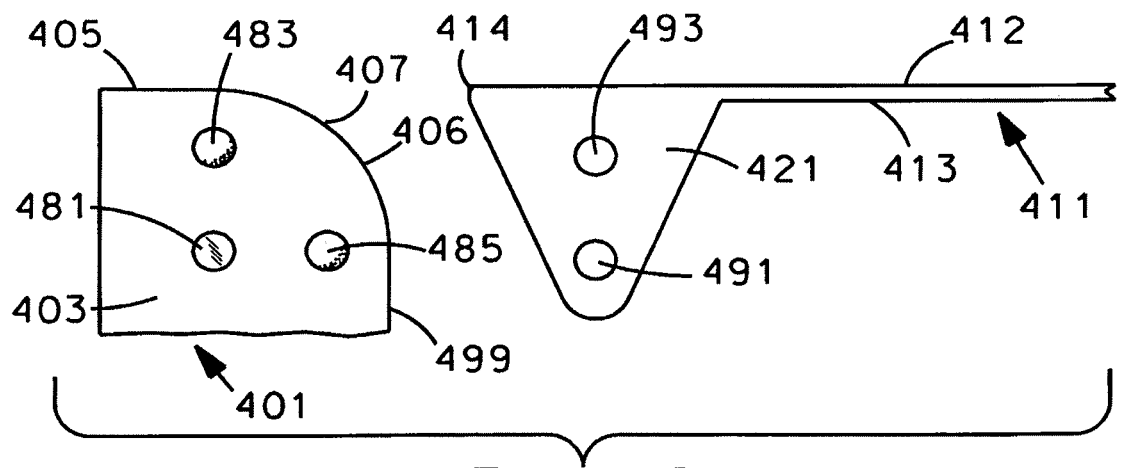
FIG. 12 is an exploded side view of the hinge portion of the top part of the GPS device of FIG. 10 comprising the top part of the GPS unit and the visor, said visor being in the open position.

FIG. 12 is an exploded side view of the hinge portion of the top part of the GPS device of FIG. 10 comprising the top part of the GPS unit and the visor at the point of attachment, said visor being in the open position, showing the quarter-circle 407 being concentric with the protruding cylindrical post 481, which, when fully assembled, allows the visor 411 to rotate around the posts 481 (and 482) and to assume the horizontally open position when aperture 493 fits over the semispherical protrusion member 483 (and aperture 494 fits over the semispherical protrusion member 484), and to assume the vertically closed position when aperture 493 fits over the semispherical protrusion member 485 (and aperture 494 fits over the semispherical protrusion member 486).

FIG. 13 is a perspective view of the GPS device of FIG. 10 with the visor 411 being in the closed position to protect the display screen 402, showing the fitting of the aperture 493 over the semispherical protrusion member 485 while the semispherical protrusion member 483 is not engaged.

FIG. 14 is a perspective view of an embodiment of a GPS device with a permanently attached, retractable visor of the present invention, with the visor being in the open position, comprising the GPS unit 501 having a front side 505 comprising the display screen 502, and a top side 504, the top of said front side 505 having the opening 506 that communicates with the housing (or casing, or slot) 507 (hidden, but shown in FIG. 15) that is located below the top side 504 and that can receive the retractable visor 511, said visor 511 can move freely through the opening 506 of the housing 507 on the top of front side 505, said visor 511 having the top face 512, the bottom face 513, the proximal edge 514 (hidden), two lateral edges 515 and 516 that are adjacent to the proximal edge 514, and the distal edge 517 that is farthest away from the GPS unit 501, said proximal edge 514 is retained inside the slot 506 and has two stops 524 and 525 (hidden) on the bottom face 513 at the corners of the proximal edge 514 to prevent the retractable visor 511 from being fully removed from the opening 506 and the housing 507, said stops 524 and 525 can move along two tracks 534 and 535 to allow the visor to assume the open position (when the stops 524 and 525 touch the structure defining opening 506) and allow the visor to retract to the fully retracted position. The housing 507 and the stops 524 and 525 serve as the attachment means. When not in use, the visor 511 can be pushed back to the fully retracted position and stored inside housing 507 such that only a small part of the distal edge 517 remains outside of the opening 506 so that the visor 511 can be pulled out for use when needed.

FIG. 15 is a partial cross-sectional view of the GPS device of FIG. 14, taken along the line 15-15 of FIG. 14 showing the part of the top side of the GPS unit 501 having the housing 507 situated underneath the top side 504 and two tracks 534 and 535 that allow the stops 524 and 525 of visor 511 to move along the tracks in order for the visor 511 to take either the open or closed position.

Figure 16:
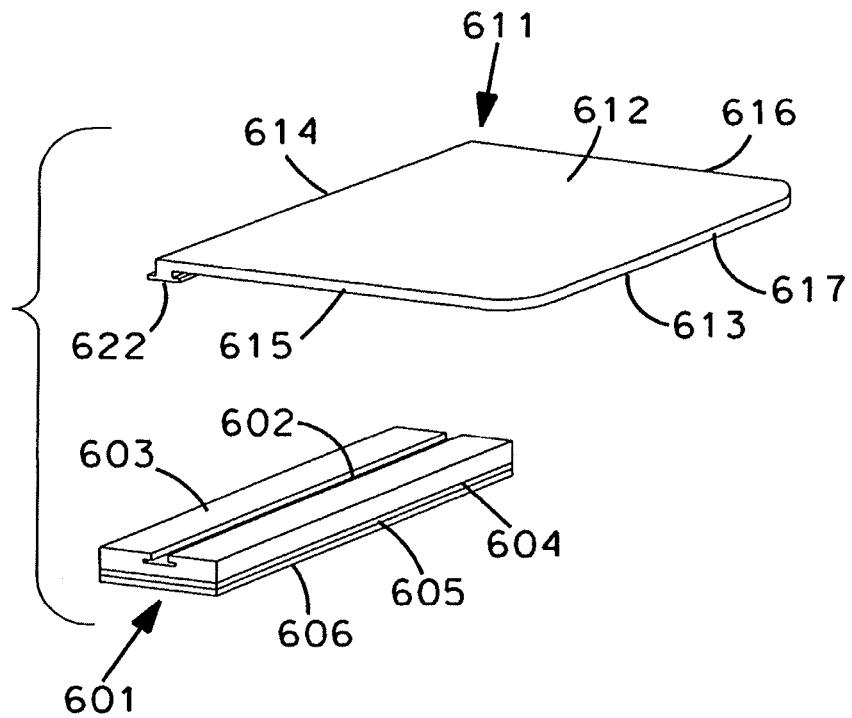
FIG. 16 shows an exploded perspective view of an embodiment of a removable visor of the present invention, comprising a flexible grooved element to be permanently attached to the top side of a GPS unit, and a visor having a flexible long lip at the proximal edge of its bottom face, said flexible long lip can be inserted into the mating groove of the grooved element that is affixed to the GPS unit to attach the visor to the GPS unit.

FIG. 16 shows an exploded perspective view of an embodiment of a removable visor set of the present invention, comprising a flexible grooved element 601 to be permanently attached to the top side of a GPS unit, and a visor 611 having a flexible long mating lip that can be inserted and snugly fitted into the groove of the grooved element. The grooved element 601 comprises a long recessed groove 602 on the top side 603, and a flat bottom side 604 having an adhesive layer 605 for permanently affixing the grooved element to the top side of a GPS unit, said adhesive layer is initially covered with the release paper (or the release film strip) 606 to protect the adhesive from prematurely sticking to a surface other than the intended top side of the GPS unit. The grooved element 601 will be permanently affixed to the top side of a GPS unit. The visor 611 comprises the top face 612, the bottom face 613, the proximal edge 614 that is closest to the grooved element 601, two lateral edges 615 and 616 that are adjacent to the proximal edge 614, and the distal edge 617 that is farthest away from the GPS unit, with the visor further comprising the long lip 622 that extends from the bottom face 613 of the visor 611 along the proximal edge 614. Said lip 622 can be inserted and snugly and matingly fitted into the groove 602 of the grooved element 601 to attach the visor to the GPS unit. The grooved element 601 with groove 602 and mating lip 622 serve as the attachment means for this embodiment of the present invention. Visor 611 can be removed from the GPS unit when not needed by the user by moving the lip 622 out of groove 602. Since commercially available GPS units can have many designs, some of which can have on/off button and other switches located at the top side of the GPS unit, the removable visors of the present invention will allow for modifications with appropriate openings so that the user can access those buttons and switches when using, or before using the visor.

Figure 17:
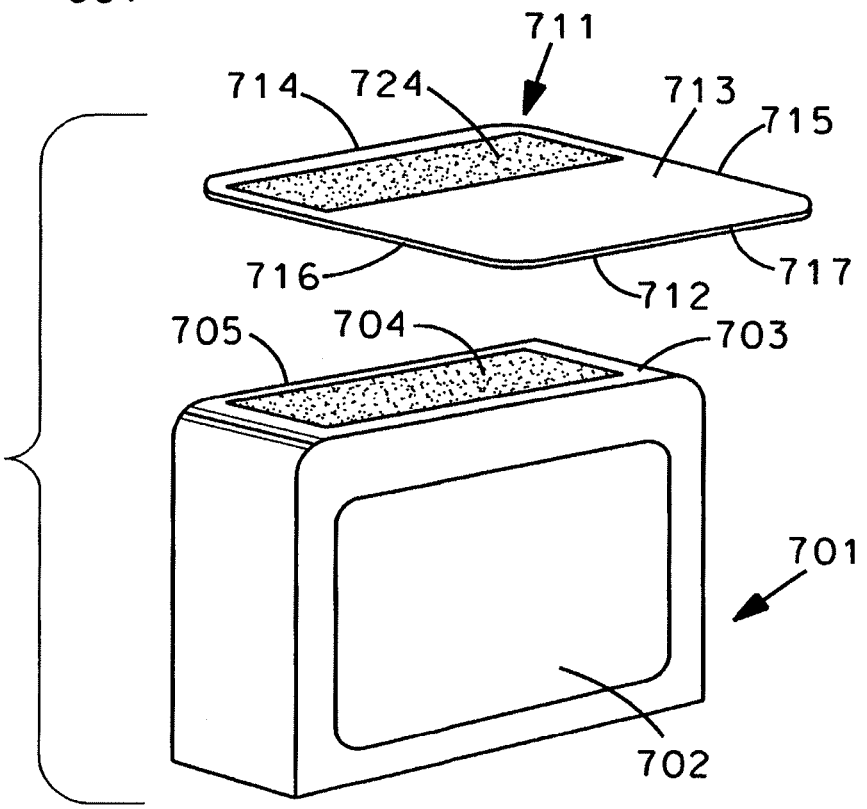
FIG. 17 shows an exploded perspective view of an alternative embodiment of a GPS device of the present invention, comprising a GPS unit and a visor that is attached to the GPS unit by loop-and hook Velcro®-like strips as attachment means (FIG. 17 also illustrates an alternative embodiment of the removable visor of FIG. 16 comprising a removable visor and the attachment means comprising two mating Velcro-type strips (instead of the lip and groove fastening system), with one strip permanently being affixed along the proximal edge of the visor, and the mating strip being permanently affixed to the top side of the GPS unit using an adhesive layer)

FIG. 17 shows an exploded perspective view of an alternative embodiment of a GPS device of the present invention, comprising the GPS unit 701, and the visor 711 that is attached to the GPS unit by loop-and-hook Velcro-like strips as attachment means. The GPS unit 701 comprises the display screen 702, a top side 703, and a Velcro strip 704, e.g., a hook strip or a loop strip, which is permanently affixed to the top side 703 using the adhesive layer 705. The visor 711 comprises the top face 712, the bottom face 713, the proximal edge 714, two lateral edges 715 and 716 that are adjacent to the proximal edge 714, and the distal edge 717 that is farthest away from the GPS unit 701, and a mating Velcro-type strip 724, e.g., a loop strip or a hook strip, which is permanently affixed to the bottom face 713 along the proximal edge 714. In use, the visor 711 is attached to the GPS unit 701 by pressing the Velcro-type strip 724 to Velcro-type strip 704 such that the visor 711 provides the shielding for the display screen 702.

An alternative embodiment of the removable visor of FIG. 14 comprises visor element 711 and the attachment means comprising two mating Velcro-type strips, with one strip permanently being affixed along the proximal edge 714 of the visor element 711, and the mating strip to be permanently affixed to the top side of a GPS unit using an adhesive layer. Said adhesive layer is initially covered with a release paper strip to protect the adhesive from prematurely sticking to a surface other than the intended top side of the GPS unit. Once assembled, this GPS device will function in the same manner as the GPS device of FIG. 17.

Figures 18, 19:
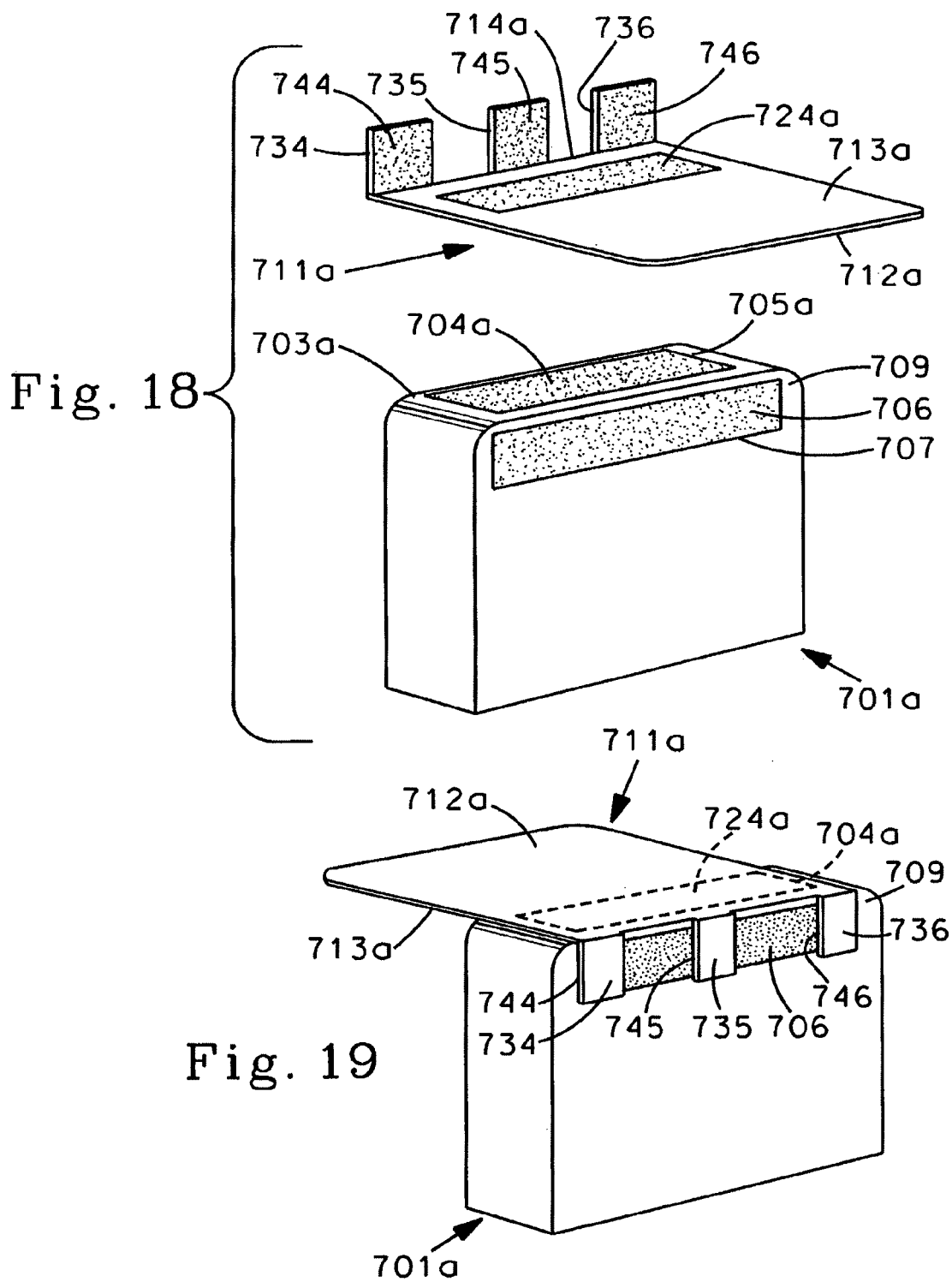
FIG. 18 shows an exploded perspective view of an alternative embodiment of the GPS device of FIG. 17, comprising the GPS unit of FIG. 17 having an additional Velcro-type strip that is permanently affixed to the top back side of the GPS unit using an adhesive layer, in addition to the Velcro-type strip that is permanently affixed to the top side of the GPS, and a visor having additional Velcro elements that are permanently affixed to the flexible periphery members that are extended from the proximal edge, in addition to the Velcro-type strip that is permanently affixed to the bottom face along the proximal edge of the visor.
FIG. 19 is a perspective view of the removable visor of FIG. 18 that is attached to the GPS unit, viewed toward the back-side of the GPS unit.

FIG. 18 shows an exploded perspective view of an alternative embodiment of the GPS device of FIG. 17, comprising the GPS unit 701 of FIG. 17 now designated as 701a comprising the Velcro-type strip 706 that is permanently affixed to the top of the back side 709 of the GPS unit 701a using the adhesive layer 707, in addition to the Velcro-type strip 704a that is permanently affixed to the top side 703a of the GPS unit 701a using the adhesive layer 705a; and the visor 711a that is similar to the visor 711 of FIG. 17, comprising the Velcro-type strip 724a that is permanently affixed to the bottom face 713a along the proximal edge 714a, said visor 711a additionally comprising Velcro elements 744, 745, and 746 that are permanently affixed to the flexible periphery members 734, 735, and 736 that are extended from proximal edge 714a, said Velcro elements 744, 745, and 746 being affixed on the side of the bottom face 713a, said Velcro elements 744, 745, and 746 are to be attached to strip 706 to strengthen the attachment of the visor 711a to the GPS unit 701a. An article of manufacture comprising the visor 711a and adhesive-back Velcro-type strips 704a and 706a (with appropriate protective release paper strips) can be used to provide shielding benefit for commercially available GPS units. This embodiment that has additional means to attach the visor to the top back side of the GPS unit is particularly useful to secure the visor to the desired position when the GPS unit has a thin body and/or a narrow top side.

FIG. 19 is a perspective view of the GPS device of FIG. 18 when assembled, with the removable visor 711a of FIG. 18 being attached to the GPS unit 701a by the Velcro-type attachment means, as viewed toward the backside of the GPS unit.

Figure 20:
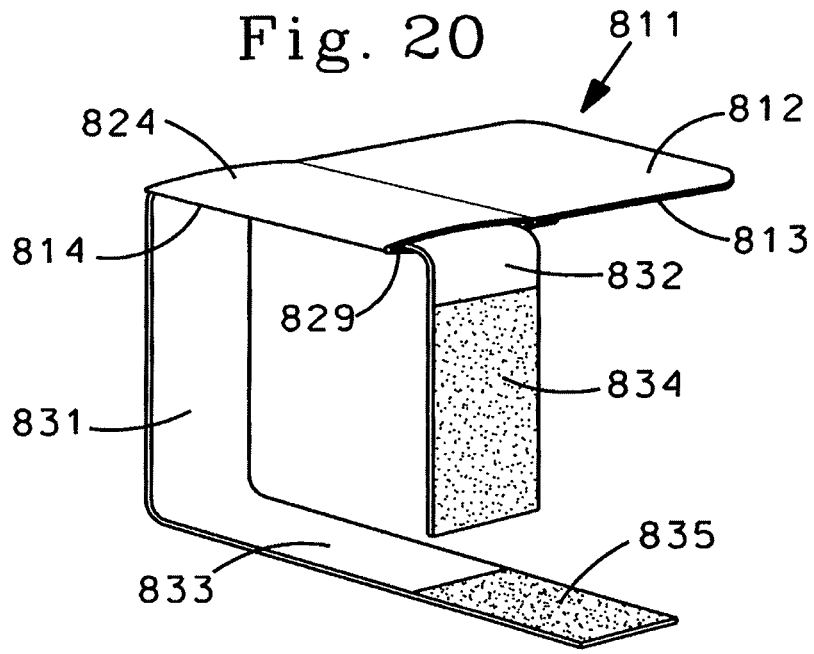
FIG. 20 is a perspective view of an alternative embodiment of a removable visor having a flat and flexible, typically elastic strap with Velcro ends which are used for adjustably wrapping the strap around the sides of a GPS unit to tightly attach the visor to the GPS unit.
Figure 21:
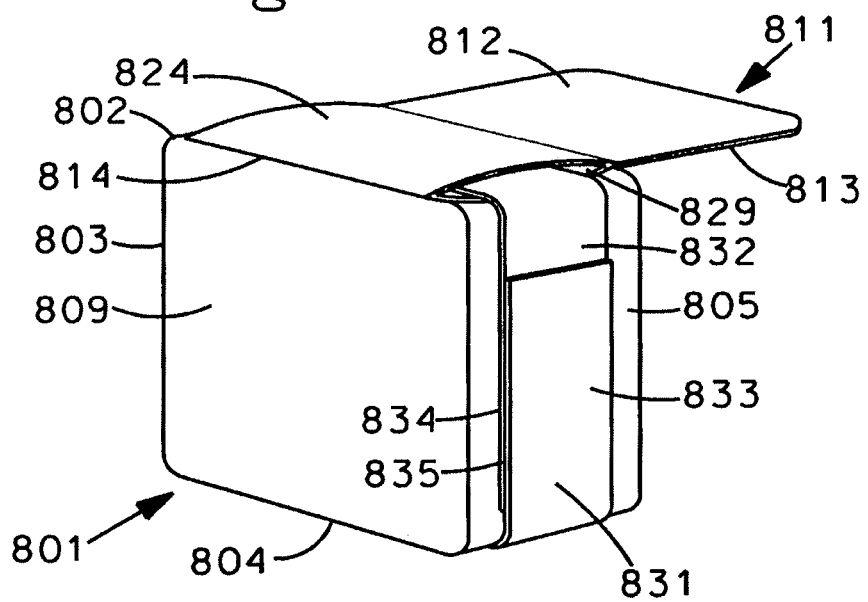
FIG. 21 is a perspective view of the removable visor of FIG. 20, showing the elastic strap tightly wrapping around the sides of a GPS unit with the two ends of the strap being firmly joined together by the mating Velcro surfaces, viewed toward the back side of the GPS unit.

FIG. 20 is an exploded perspective view of an alternative embodiment of a removable visor set of the present invention, comprising the visor 811 having the top face 812, the bottom face 813, the proximal edge 814 having the casing (or a sheath) 824 to contain an attachment means in the form of a flat and flexible, typically elastic, belt-like strip 831 that has two ends 832 and 833, said strip 831 is inserted into the casing opening (or slit) 829 of the casing 824; wherein said ends 832 and 833 can be joined together by each having one of a pair of mating Velcro surfaces 834 and 835, respectively, said strap with Velcro ends is used for adjustably wrapping the strap around the sides of a GPS unit to tightly attach the visor 811 to a GPS unit, such as GPS unit 801 that is shown in FIG. 21.

FIG. 21 is a perspective view of a typical GPS unit 801 when it is assembled with the removable visor set 811 of FIG. 20, comprising the flat, elastic strip 831 that tightly wraps around the top, lateral, and bottom sides 802, 803, 805, and 804 of the GPS unit 801, with the two ends of the strip, 832 and 833, being firmly joined together by the mating Velcro surfaces 834 and 835, viewed toward the back side 809 of the GPS unit.

Figure 22:
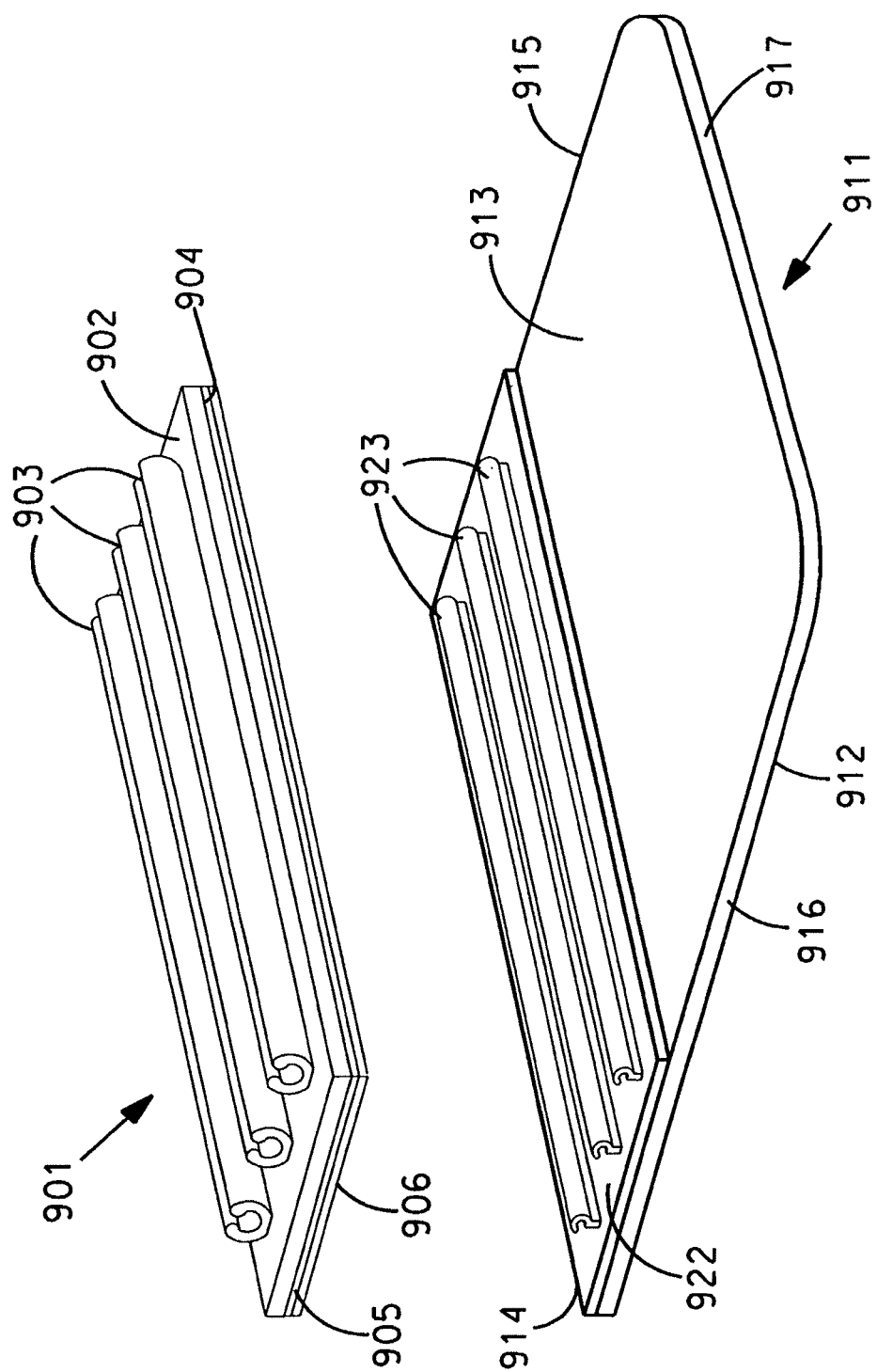
FIG. 22 is an exploded perspective view of an alternative embodiment of the removable visor of FIG. 16, with the flexible grooved element being replaced by a multiple grooved element having a plurality of Ziploc™-type grooves said grooved element capable of being permanently attached to the top side of a GPS unit, and the visor having a flexible long strip of mating Ziploc-type ribs at the proximal edge of its bottom face, so that said mating strip can be pressed and interlocked into the grooves of the grooved element that is affixed to the top side of the GPS unit to attach the visor to the GPS unit.

FIG. 22 is an exploded perspective view of an alternative embodiment of the removable visor set of FIG. 16, wherein the flexible grooved element 601 is replaced by a multiple grooved element 901 having a plurality of Ziploc-type grooves, the element 901 is capable of being permanently attached to the top side of a GPS unit, and a visor element 911 having a flexible long strip of mating Ziploc-type ribs that can be pressed and interlocked into the mating grooves of the grooved element. The grooved element 901 has a multitude of long flexible Ziploc-type grooves 903 on the top side 902, and a flat bottom side 904 having an adhesive layer 905 for permanently affixing the grooved element to the top side of a GPS unit, said adhesive layer is initially covered with the release paper strip 906 to protect the adhesive from prematurely sticking to a surface other than the intended top side of the GPS unit. The visor 911 has the top face 912, the bottom face 913, the proximal edge 914 that is closest to the GPS unit, two lateral edges 915 and 916 that are adjacent to the proximal edge 914, and the distal edge 917 that is farthest away from the GPS unit, with the visor 911 further having a flexible long strip 922 comprising a plurality of flexible Ziploc-type ribs 923 that extends from the bottom face 913 of the visor 911 along the proximal edge 914, wherein said Ziploc-type ribs 923 have a mating fit with the grooves 903 of the grooved element 901. Once the grooved element 901 is permanently affixed to the top side of a GPS unit, the proximal edge 914 for the visor 911 can be pressed against the top side of the GPS unit so that the ribs 923 can snugly fit and interlock into the mating grooves 903 of the grooved element 901 on top of the GPS unit to attach the visor 911 to the GPS unit. Visor 911 can be removed from the GPS unit when not needed by the user, by pealing ribs 923 of the proximal edge 914 from the grooves 903 on the top of the GPS unit.

Figure 23:
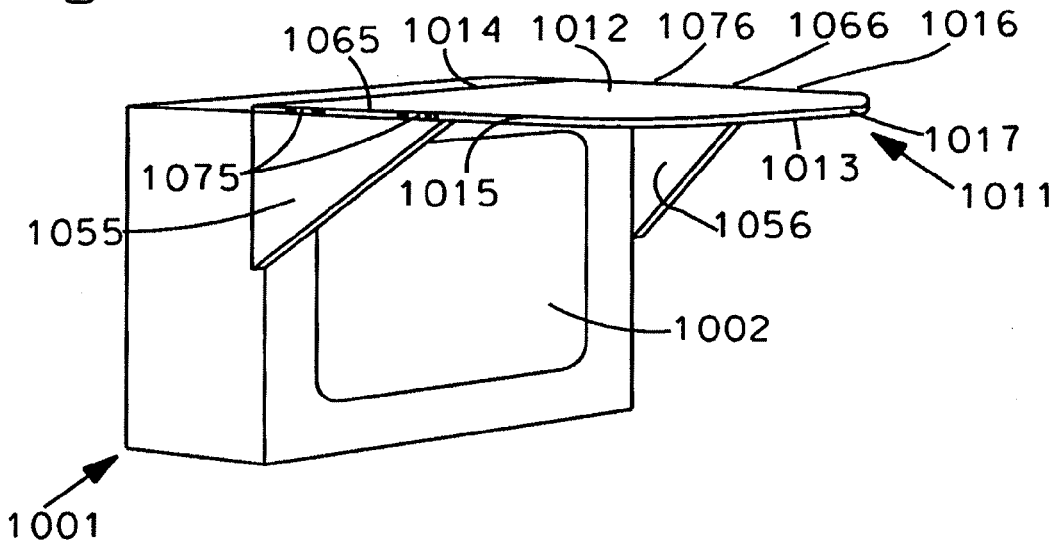
FIG. 23 is a perspective view of an alternative embodiment of a visor element comprising side shields of the present invention.

FIG. 23 is a perspective view of an alternative embodiment of a visor element comprising side shields of the present invention, comprising the visor 1011 having the top face 1012, the bottom face 1013, the proximal edge 1014, two lateral edges 1015 and 1016 that are adjacent to the proximal edge 1014, and the distal edge 1017, said visor additionally comprises triangular side shields 1055 and 1056 that are vertically bent downward from edges 1015 and 1016, respectively, said side shields 1055 and 1056 intersect the visor at line segments 1065 and 1066 of the edges 1015 and 1016, respectively. Optionally, the side shields 1055 and 1056 can be folded against the bottom face 1013 using the optional hinges 1075 and 1076, respectively that can be attached at line segments 1065 and 1066. The visor 1011 can be attached to the GPS unit 1001 using any suitable attachment means, typically the attachment means given herein.

An alternative embodiment of the visor element of FIG. 23 comprises the visor 1011 and side shields 1055 and 1056 all being a contiguous flat piece of a resilient material, where said flat piece is folded along edges 1065 and 1066 to form the visor 1011 and the two side shields 1055 and 1056.

Figure 24:
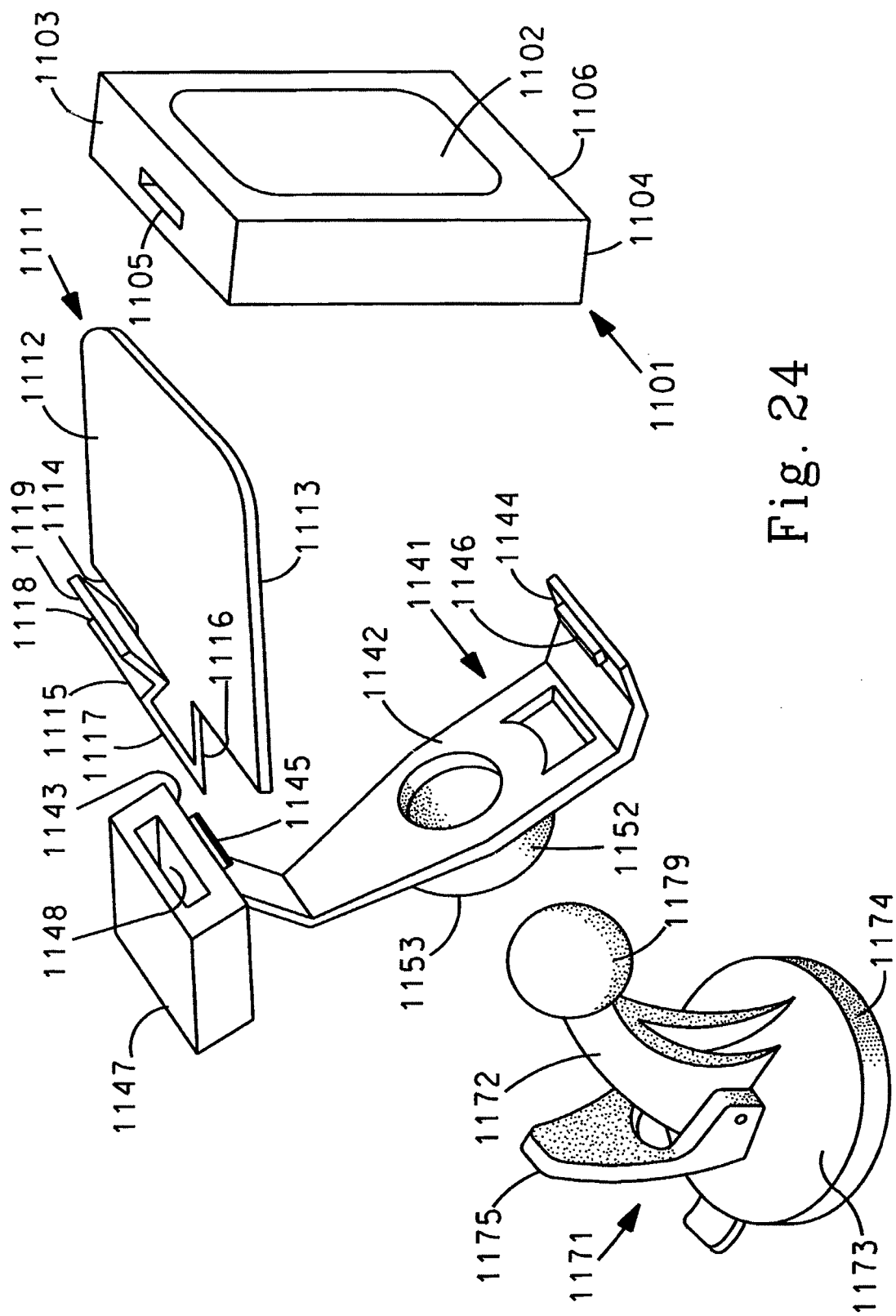
FIG. 24 is an exploded perspective view of an alternative embodiment of a GPS device with a removable visor of the present invention, comprising a GPS unit, a visor, a suction cup mount, and a cradle; said GPS unit comprises an indented slot at the bottom side and an indented slot at the top side to receive the two protruding elongated notches of the cradle to attach the GPS unit to the cradle; said cradle also comprises a round socket comprising a hemi-spherical receptacle to receive the spherical ball of the suction cup mount, and a top box comprising the receptacle to receive the clip of the visor; said visor comprises a clip that is extended from the proximal edge in a position that allows the clip to be inserted and snugly fitted into the receptacle of the cradle to attach the visor to the cradle; said suction cup mount comprises a body connecting at one end to the circular, concave base, and at the other end to the spherical ball, said base is adapted with the polymeric suction cup connected with the lever that can pull the center of the polymeric cup up to provide suction or push the center of the polymeric cup down to release the suction.

FIG. 24 is an exploded perspective view of an alternative embodiment of a GPS device with a removable visor of the present invention, comprising the GPS unit 1101, the visor 1111, the cradle 1141, and the suction cup mount 1171. The GPS unit 1101 comprises the display screen 1102, the top side 1103, the bottom side 1104, the indented slot 1105 at the top side 1103, and the indented slot 1106 (hidden) at the bottom side 1104. The visor 1111 comprises the top face 1112, the bottom face 1113, the proximal edge 1114 and the clip 1115 that is extended from the proximal edge 1114 in a position that allows the clip 1115 to be inserted and snugly fitted into the receptacle 1148 of the cradle 1141 to attach the visor 1111 to the cradle 1141, with said clip 1115 comprising the main member 1116 and the lever 1117, said lever having the notch 1118 and the handle 1119. For use, the clip 1115 is locked into the receptacle 1148 to attach the visor 1111 to the cradle 1141 in order for visor 1111 to provide the shielding to the display screen 1102 of the GPS unit 1101. Visor 1111 can be removed from the cradle 1141 when not needed by the user unlocking clip 1115 from receptacle 1148 by pressing the handle 1119 close to the main member 1116 with the user's thumb and fingers, then pulling the clip 1115 of visor 1111 from the receptacle 1148. The cradle 1141 comprises the body 1142 comprising the upper prong 1143 and the lower prong 1144, said prongs 1143 and 1144 together clamp the GPS unit 1101 firmly by the top side 1103 and the bottom side 1104, respectively, of the GPS unit 1101, said upper prong 1143 comprises the protruding elongated structure 1145 and said lower prong 1144 comprises the protruding elongated structure 1146, with said structure 1145 having a slightly shorter length than the length of the mating indented slot 1105, and said structure 1146 having a slightly shorter length than the length of the mating indented slot 1106. Said structures 1145 and 1146 snap snugly into the indented slots 1105 and 1106, respectively, when the GPS unit 1101 is placed in the cradle 1141 to firmly lock the GPS unit 1101 to the cradle 1141. The cradle 1141 additionally comprises the top box 1147 comprising the receptacle 1148 to receive the clip 1115 of the visor 1111, and the round socket 1152 comprising a hemi-spherical receptacle 1153 to receive the spherical ball 1179 of the suction cup mount 1171. The suction cup mount 1171 comprises the body 1172 connecting at one end to the circular, concave base 1173, and at the other end to the spherical ball 1179, said base 1173 is adapted with the polymeric suction cup 1174 which is connected with the lever 1175 that can pull the center of the polymeric cup 1174 up to provide suction or push the center of the polymeric cup 1174 down to release the suction. To assemble the GPS device of FIG. 24 for use, the ball 1179 on the end of the mount 1171 is fitted into the round receptacle 1153 on the cradle 1141, and the ball and the receptacle are pressed firmly until they snap together. The suction cup 1174 is placed on the windshield of a motor vehicle, and the lever 1175 is flipped back toward the windshield to affix the mount 1171 onto the windshield. The bottom side 1104 of the GPS unit 1101 is pressed into the bottom prong 1144 of the cradle 1141 and then the top side 1103 of the GPS unit 1101 is snapped into the top prong 1145. The visor 1111 is then affixed to the cradle 1141 by snapping the clip 1115 into the receptacle 1148 to provide shielding for the display screen 1102.

Instead of the windshield, the mount 1171 can alternatively be affixed onto a dashboard of a motor vehicle via a non-skid friction mount with a smooth surface or a mounting disk with a smooth face that is affixed to the dashboard with an adhesive layer.

Figure 25:
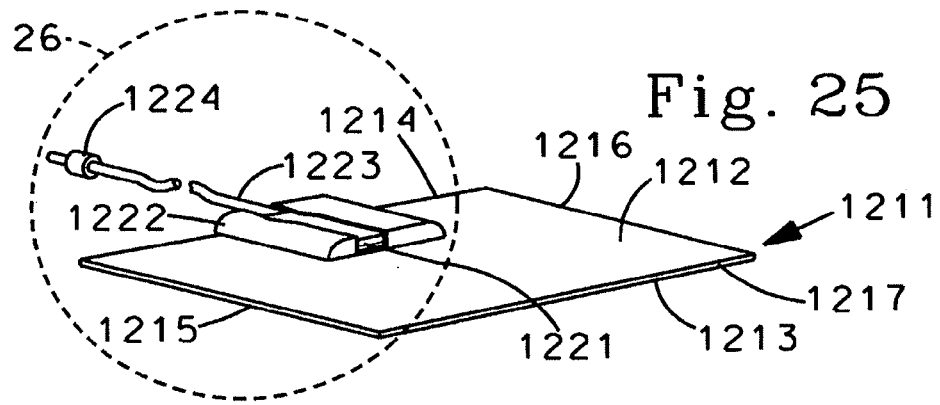
FIG. 25 is a perspective view of an embodiment of a generic visor comprising a flat external GPS antenna, said visor can be attached to a GPS unit using a suitable attachment means (not shown), said visor comprising a GPS antenna, a coaxial antenna cable, and a coaxial connector to connect the antenna to an external antenna jack of the GPS unit.

FIG. 25 is a perspective view of an embodiment of a generic visor 1211 comprising an external GPS antenna (such as a flat microstrip antenna), with a portion of the top cover of the visor being partly cut away to show the flat antenna contained inside, said visor can be attached to a GPS unit using any suitable attachment means (not shown), typically the attachment means given herein. Visor 1211 comprises the top face 1212, the bottom face 1213, the proximal edge 1214, two lateral edges 1215 and 1216 that are adjacent to the proximal edge 1214, and the distal edge 1217. The top face 1212 comprises the flat GPS antenna 1221 that is protected by the cover 1222, the coaxial antenna cable 1223, and the coaxial connector 1224 to connect the antenna to an external antenna jack of the GPS unit. The circle area 26 of the visor 1211 shows the cover 1222 that is partly cut away to show the flat antenna 1221 contained inside the cover 1222.

Figure 26:
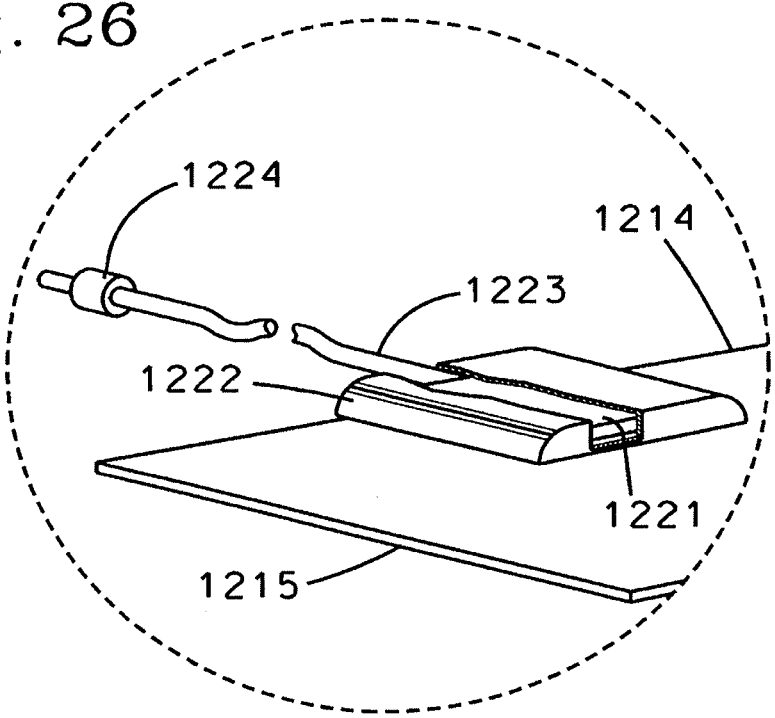
FIG. 26 is the magnification of the cut away area of FIG. 25 to provide an enlarged view of the cover that is partly cut away to show the flat antenna that is contained inside the cover.

FIG. 26 is the magnification of the cut away area 26 of FIG. 25 to provide an enlarged view of the cover 1222 that is partly cut away to show the flat antenna 1221 that is contained inside the cover 1222.

Figure 27:
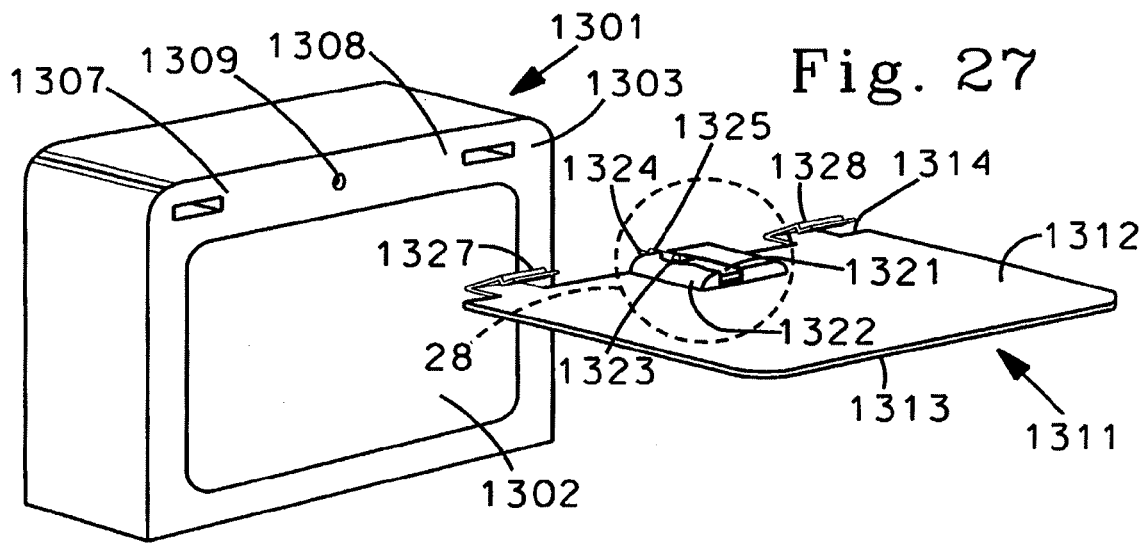
FIG. 27 is a exploded perspective view of an embodiment of a GPS device having a visor with an external antenna of the present invention, comprising a GPS unit and a visor, wherein the GPS unit comprises two hollow receptacles and an external coaxial antenna jack at the top front side of the GPS unit, and the visor comprises a flat GPS antenna that is linked to a coaxial connector and two clips, said clips and the coaxial connector are attached to the proximal edge of the visor in positions that allow the clips and the connector to be inserted and snugly fitted into the mating receptacles and the external antenna jack, respectively, of the GPS unit to attach the visor to the GPS unit.

FIG. 27 is an exploded perspective view of an embodiment of a GPS device having a visor comprising an external GPS antenna of the present invention, comprising the GPS unit 1301 and the visor 1311, with a portion of the top cover of the visor being partly cut away to show the flat antenna contained inside. This GPS device is an adaptation of the GPS device of FIG. 7, wherein the GPS unit 1301 comprises the display screen 1302, two hollow receptacles 1307 and 1308, and an external coaxial antenna jack 1309 at the top front side 1303, with the receptacles 1307 and 1308, and the external antenna jack 1309 being one part of the attachment means to attach the removable visor 1311 to the GPS unit 1301. The visor 1311 comprises the top face 1312, the bottom face 1313, the proximal edge 1314, and two clips 1327 and 1328 that are extended from the proximal edge 1314, said top face 1312 comprising the flat GPS antenna 1321 that is protected by the cover 1322, the coaxial antenna cable 1323, and the coaxial connector 1324 to connect the antenna to the external antenna jack 1309 of the GPS unit 1301, with the antenna cable 1323 being protected and strengthened by the hemi-cylindrical element 1325 that is firmly attached to the visor 1311. Clips 1327 and 1328 and the coaxial connector 1324 are attached to the proximal edge 1314 in positions that allow the clips 1327 and 1328 and the connector 1324 to be inserted and snugly fitted into the mating receptacles 1307 and 1308, and the external antenna jack 1309, respectively, of the GPS unit 1301 to attach the visor 1311 to the GPS unit 1301, with the clips 1327 and 1328, the fortified connector 1324, and the element 1325 being the other part of the attachment means. The circle area 28 of the visor 1311 shows the cover 1322 that is partly cut away to show the flat antenna 1321, the short coaxial antenna cable 1323, and the hemi-cylindrical element 1325 that are contained inside the cover 1322.

Figure 28:
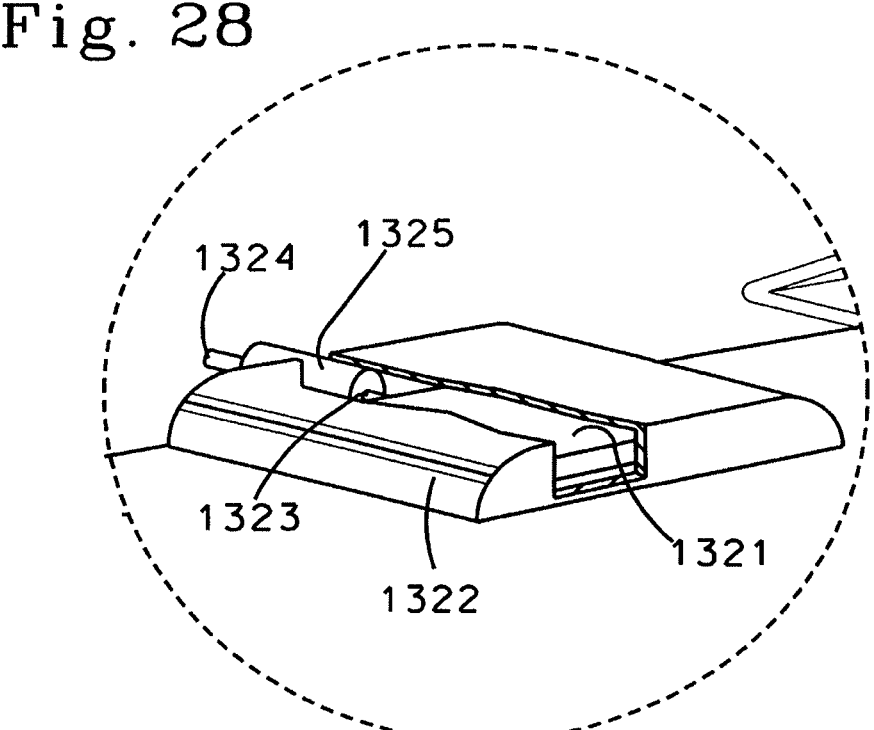
FIG. 28 is the magnification of the cut away area of FIG. 27 to provide an enlarged view of the cover that is partly cut away to show the flat antenna, the short coaxial antenna cable, and part of the hemi-cylindrical element that are contained inside the cover.

FIG. 28 is the magnification of the cut away area 28 of FIG. 27 to provide an enlarged view of the cover 1322 that is partly cut away to show the flat antenna 1321, the short coaxial antenna cable 1323, and part of the hemi-cylindrical element 1325 that are contained inside the cover 1322.

The above description discloses, by way of example, some typical embodiments of the present invention. However, persons of ordinary skill in the art are capable of creating numerous modifications within the scope of the claims. Changes in specifics of form and details can be made to the above-described embodiments. The claims and not the examples are the measure of the protected invention.

What is claimed is:

1. A mounting assembly for a portable Global Positioning System (GPS) unit, comprising:
   (a) a suction cup mount comprising a body connecting at a first end to a base, and at a second end to a ball, said base including a polymeric suction cup and a lever,
   (b) a cradle that attaches to the suction cup mount, the cradle comprising a body comprising an upper prong and a lower prong, said prongs together clamp a GPS unit, and further comprises a socket comprising a receptacle to receive the ball of the suction cup mount, and wherein the cradle has a clip receptacle, and
   (c) a removable GPS visor that is attached to the cradle the GPS visor comprising a flat piece of material having a proximal edge, and a clip that extends from the proximal edge of the visor and can insert into the clip receptacle of the cradle, to attach the visor to the cradle for shielding the display screen of the GPS unit to improve the viewing of the information that is displayed on the display screen of the GPS unit under bright light and/or to eliminate or reduce the reflection of the lighted display screen of the GPS unit from the motor vehicle's front windshield in nighttime driving.

2. The mounting assembly according to claim 1 wherein each of the upper prong and the lower prong includes a protruding structure, wherein the protruding structures of the upper prong and the lower prong snap into an indented slot in a top side and a bottom side of a GPS unit, to secure the GPS unit to the cradle.

3. The mounting assembly according to claim 1 wherein the clip of the visor comprises a main member that extends from the GPS visor, and a lever having a notch to lock the clip into the clip receptacle of the cradle, and a handle that can be pressed to unlock the notch, to remove the visor from the cradle.

4. The mounting assembly according to claim 1 wherein the flat piece of material is made of a material selected from the group consisting of plastic film, polymeric film, molded plastic, polymeric foam, paper, cardboard, composite materials, or laminated materials, and the visor has a length of from about 3 cm to about 20 cm and a width of from about 3 cm to about 15 cm.

5. The mounting assembly according to claim 4 wherein the flat piece of material and the clip of the visor are integral and made of plastic.

6. The mounting assembly according to claim 4 wherein the visor has a dark color, and the color is black, dark blue, dark red, dark purple, crimson, dark green, or combinations thereof.

7. The mounting assembly according to claim 1 wherein the visor further comprises two side shields.

8. The mounting assembly of claim 1 wherein the visor has one or more openings.

9. The mounting assembly of claim 8 wherein the one or more openings permit access to an on/off bottom or switch located on a top side of the GPS unit.

10. The mounting assembly according to claim 1 wherein the visor further comprises a GPS antenna.

11. The mounting assembly according to claim 10 wherein the GPS antenna is a supplemental GPS antenna that connects to the GPS unit to provide an improved reception of GPS satellite signals, and thereby minimize distraction during driving.

12. An article of manufacture to improve the viewing of the information that is displayed on the display screen of a portable GPS unit under bright light and/or to eliminate or reduce the reflection of the lighted display screen of the GPS unit from the motor vehicle's front windshield in nighttime driving, comprising:
    (a) a mounting assembly for a portable GPS unit, comprising
        (i) a suction cup mount comprising a body connecting at a first end to a base, and at a second end to a ball, said base including a polymeric suction cup and a lever,
        (ii) a cradle that attaches to the suction cup mount, the cradle comprising a body comprising an upper prong and a lower prong, said prongs together clamp a GPS unit, the cradle further comprising a socket comprising a receptacle to receive the ball of the suction cup mount, and wherein the cradle has a clip receptacle, and
        (iii) a removable GPS visor that is attached to the cradle, the GPS visor comprising a flat piece of material having a proximal edge, and a clip that extends from the proximal edge of the visor and can insert into the clip receptacle of the cradle, wherein the clip comprises a main member that extends from the proximal edge, and a lever having a notch to lock the clip into the clip receptacle, and a handle that can be pressed to unlock the notch, to remove the visor from the cradle, and
    (b) instructions for use with the directions to affix and remove the visor to and from the cradle, and the cradle to the suction cup mount, the instructions for use including instructions for:
        (i) attaching the cradle to the suction cup mount by inserting the ball of the suction cup mount into the receptacle of the cradle;
        (ii) attaching the GPS unit to the cradle by inserting the GPS unit between the upper prong and of the cradle;
        (iii) attaching the GPS visor to the cradle by inserting the clip of the visor into the clip receptacle of the cradle;
        (iv) attaching the suction cup mount to the windshield or dashboard of a motor vehicle; and
        (v) removing the GPS visor from the cradle, by pressing the handle of the clip to unlock the notch from the clip receptacle.

13. The article of manufacture according to claim 12 wherein the flat piece of material is made of a material selected from the group consisting of plastic film, polymeric film, molded plastic, polymeric foam, paper, cardboard, composite materials, or laminated materials, and the visor has a length of from about 3 cm to about 20 cm and a width of from about 3 cm to about 15 cm.

14. The article of manufacture according to claim 13 wherein the visor has a dark color, and the color is black, dark blue, dark red, dark purple, crimson, dark green, or combinations thereof.

15. The article of manufacture according to claim 12 wherein the visor further comprises two side shields.

16. The article of manufacture according to claim 12 wherein the visor has one or more openings.

17. The article of manufacture according to claim 16 wherein the one or more openings permit access to an on/off bottom or switch located on a top side of the GPS unit.

18. The article of manufacture according to claim 12 wherein the visor additionally comprises a GPS antenna.

19. The article of manufacture according to claim 18 wherein the GPS antenna is a supplemental GPS antenna that connects to the GPS unit to provide an improved reception of GPS satellite signals, and thereby minimize distraction during driving.

20. The article of manufacture according to claim 19 wherein the visor has one or more openings that allow the user access the on/off button and other switches located at the top side of the GPS unit.

21. An article of manufacture comprising
    (a) a cradle for mounting a portable GPS unit, the cradle being attachable to a suction cup mount, the cradle comprising a body comprising an upper prong and a lower prong, said prongs together clamp the portable GPS unit, the cradle further comprising a socket comprising a receptacle to receive a ball of the suction cup mount, and wherein the cradle has a clip receptacle;
    (b) a removable GPS visor that attaches to the cradle, the GPS visor comprising a flat piece of material having a proximal edge, and a clip that extends from the proximal edge of the visor, and can insert into the clip receptacle, wherein the clip comprises a main member that extends from the proximal edge, and a lever having a notch to lock the clip into the clip receptacle, and a handle that can be pressed to unlock the notch, to remove the visor from the cradle; and
    (c) instructions for use including instructions for:
        (i) attaching the cradle to a suction cup mount by inserting a ball of the suction cup mount into the receptacle of the cradle;
        (ii) attaching the GPS unit to the cradle by inserting the GPS unit between the upper prong and lower prong of the cradle;
        (iii) attaching the GPS visor to the cradle by inserting the clip of the visor into the clip receptacle of the cradle;

(iv) attaching the suction cup mount to the windshield or dashboard of a motor vehicle; and (v) removing the GPS visor from the cradle, by pressing the handle of the clip to unlock the notch from the clip receptacle.

22. The article of manufacture according to claim 21 wherein the flat piece of material is made of a material selected from the group consisting of plastic film, polymeric film, molded plastic, polymeric foam, paper, cardboard, composite materials, or laminated materials, and the visor has a length of from about 3 cm to about 20 cm and a width of from about 3 cm to about 15 cm.

23. The article of manufacture according to claim 22 wherein the visor has a dark color, and the color is black, dark blue, dark red, dark purple, crimson, dark green, or combinations thereof.

24. The article of manufacture according to claim 21 wherein the visor further comprises two side shields.

25. The article of manufacture according to claim 21 wherein the visor additionally comprises a GPS antenna.

26. The article of manufacture according to claim 25 wherein the GPS antenna is a supplemental GPS antenna that connects to the GPS unit to provide an improved reception of GPS satellite signals, and thereby minimize distraction during driving.

\* \* \* \* \*